(12) United States Patent
Martel

(10) Patent No.: US 11,975,871 B2
(45) Date of Patent: May 7, 2024

(54) ROCKET PROPELLED DRONE

(71) Applicant: Joseph William Randal Martel, Ottawa (CA)

(72) Inventor: Joseph William Randal Martel, Ottawa (CA)

( * ) Notice: Subject to any disclaimer, the term of this patent is extended or adjusted under 35 U.S.C. 154(b) by 315 days.

(21) Appl. No.: 16/883,838

(22) Filed: May 26, 2020

(65) Prior Publication Data
US 2021/0031913 A1 Feb. 4, 2021

Related U.S. Application Data

(60) Provisional application No. 62/852,520, filed on May 24, 2019.

(51) Int. Cl.
| | | |
|---|---|---|
| B64D 17/80 | (2006.01) | |
| B64C 37/00 | (2006.01) | |
| B64D 27/02 | (2006.01) | |
| B64U 10/20 | (2023.01) | |
| B64U 30/293 | (2023.01) | |
| B64U 50/15 | (2023.01) | |
| B64U 50/19 | (2023.01) | |

(52) U.S. Cl.
CPC .............. *B64U 10/20* (2023.01); *B64C 37/00* (2013.01); *B64D 17/80* (2013.01); *B64D 27/023* (2013.01); *B64U 30/293* (2023.01); *B64U 50/15* (2023.01); *B64U 50/19* (2023.01); *B64U 2201/10* (2023.01); *B64U 2201/20* (2023.01)

(58) Field of Classification Search
CPC ........... B64C 1/30; B64C 29/02; B64C 29/04; B64C 2201/167; B64D 27/023
See application file for complete search history.

(56) References Cited

U.S. PATENT DOCUMENTS

| | | | | |
|---|---|---|---|---|
| 2,673,051 A | * | 3/1954 | Frost ....................... | B64C 29/02 244/7 B |
| 3,210,025 A | * | 10/1965 | Lubben .................... | B64C 29/02 244/158.9 |
| 4,296,894 A | * | 10/1981 | Schnabele ............... | F42B 15/10 244/3.1 |

(Continued)

FOREIGN PATENT DOCUMENTS

| | | | | |
|---|---|---|---|---|
| CN | 106864744 A | * | 6/2017 | ............. B64C 27/24 |
| CN | 107839887 A | * | 3/2018 | ............... B64C 1/30 |

*Primary Examiner* — Joseph W Sanderson
(74) *Attorney, Agent, or Firm* — HAYES SOLOWAY P.C.

(57) ABSTRACT

Disclosed is a remotely controlled wireless drone which employs a solid fuel rocket engine to propel it quickly to a desired or location. More specifically, an unmanned vehicle including a fuselage and a propulsion unit engaged with the fuselage, the propulsion unit being operable to bring the unmanned vehicle to a desired altitude or location, generally during a launch stage. The fuselage also includes multiple rotors pivotally engaged with the fuselage and a rotor positioning system operable to pivot the multiple rotors between stowed and deployed positions. The stowed position of the propellers minimizes drag and instability during the launch stage, and the deployed position allows the multiple rotors to control the position and altitude of the unmanned vehicle after the fuel of the rocket engine is spent. Submersible/amphibious and other embodiments are also described.

29 Claims, 41 Drawing Sheets

(56) References Cited

U.S. PATENT DOCUMENTS

| | | | | |
|---|---|---|---|---|
| 7,226,017 | B2* | 6/2007 | Blevio, Sr. | B64C 29/0025 |
| | | | | D12/326 |
| 9,004,393 | B2* | 4/2015 | Barrett-Gonzales | B64C 27/24 |
| | | | | 244/3.28 |
| 9,878,257 | B2* | 1/2018 | Barrett | A63H 27/12 |
| 9,969,491 | B2* | 5/2018 | Strayer | B64C 39/024 |
| 10,035,597 | B2* | 7/2018 | Desrochers | B64D 17/80 |
| 10,407,169 | B2* | 9/2019 | Groninga | B64C 27/24 |
| 10,414,492 | B2* | 9/2019 | Robertson | B64C 29/02 |
| 10,766,599 | B2* | 9/2020 | Zheng | B64D 47/08 |
| 10,875,626 | B2* | 12/2020 | Hefner | B64C 11/48 |
| 11,117,666 | B2* | 9/2021 | Groen | B64C 29/02 |
| 2005/0051667 | A1* | 3/2005 | Arlton | G08B 13/19621 |
| | | | | 244/17.11 |
| 2006/0038061 | A1* | 2/2006 | Blevio, Sr. | B64C 25/32 |
| | | | | 244/23 A |
| 2012/0097801 | A1* | 4/2012 | Barrett | B64C 39/024 |
| | | | | 244/17.11 |
| 2015/0266578 | A1* | 9/2015 | Elkins | B64C 39/024 |
| | | | | 244/137.1 |
| 2016/0016652 | A1* | 1/2016 | Barrett | A63H 27/12 |
| | | | | 244/15 |
| 2017/0057635 | A1* | 3/2017 | Strayer | B63G 3/04 |
| 2017/0166308 | A1* | 6/2017 | Desrochers | B64C 1/30 |
| 2018/0057161 | A1* | 3/2018 | Groninga | B64C 11/00 |
| 2018/0057162 | A1* | 3/2018 | Robertson | B64C 27/54 |
| 2018/0281953 | A1* | 10/2018 | Groen | B64C 39/024 |
| 2018/0304984 | A1* | 10/2018 | Zheng | B64D 47/08 |
| 2019/0031316 | A1* | 1/2019 | Hefner | B64C 39/006 |
| 2020/0031458 | A1* | 1/2020 | Strauss | B64C 27/001 |

\* cited by examiner

ROCKET PROPELLED DRONE

CROSS REFERENCE TO RELATED APPLICATION

This application claims benefit to U.S. provisional application Ser. No. 62/852,520, filed May 24, 2019, the contents of which are incorporated herein by reference.

FIELD OF INVENTION

The present invention relates to a remotely controlled wireless drone, which employs a rocket engine to propel it quickly to a desired altitude or location. More specifically, the drone comprises propellers and/or rotors which are in a stowed position while the rocket engine is firing (i.e. the propellant is burning), and are then deployed and energized once the desired or target altitude or location has been reached.

BACKGROUND OF THE INVENTION

Unmanned aerial vehicles (UAVs), quadcopters, octocopters and the like, commonly and collectively known as drones, are aircraft without a human pilot aboard. Compared to manned aircraft, drones were initially used in applications requiring stealth, or in applications which were considered to be too dangerous for humans. While they originated mostly in military applications, their use is rapidly expanding to commercial, scientific, recreational, agricultural, and other applications. Civilian drones now vastly outnumber military drones, with estimates of over a million civilian drones being sold by 2015.

The global military drone market is dominated by the United States and Israel, U.S. holding a 60% military-market share in 2006 and operating over 9,000 drones in 2014. The leading civil drone companies are currently DJI (China) with $500m global sales, Parrot (France) with $110m and 3DRobotics (U.S.) with $21.6m in 2014.

Despite the rapid growth of drone use, they still have significant performance limitations. The limitations include taking a long time to reach a desired altitude or a given location. Drones which are able to reach high altitudes or remote locations and remain there for an extended period of time, are relatively expensive as they require large batteries and powerful rotor systems to lift the increased weight. Some drone systems also have fixed rotors and therefore cannot rotate the angle of the propellers for different flight modes.

There is therefore a need for an improved drone which overcomes at least some of the difficulties inherent in the prior art.

SUMMARY OF THE INVENTION

It is an object of the invention to provide an improved drone and in particular, to provide a remotely controlled wireless drone, with a rocket engine to propel it quickly to a desired altitude or location. More specifically, the drone comprises electrically-driven propellers and/or rotors which are in a stowed position while the rocket engine is firing (i.e. the propellant is burning), and are then deployed once reaching a desired altitude or location is reached.

The invention may be used in commercial, scientific, recreational, agricultural, and many other applications, such as policing, peacekeeping, surveillance, product deliveries, aerial photography, agriculture, and drone racing.

As outlined above, drones may take a long time to reach altitude and/or may take a long time to reach a desired target location. Drones which have the power to move quickly, reach high altitudes and/or remain in the air for a long period of time are generally expensive, having large, heavy batteries, and large motors to drive their propellers or rotors. In contrast, the system of the invention provides a lighter and less expensive drone with comparable or better performance by using a rocket engine to quickly propel the drone to the desired altitude or location. Solid fuel rocket engines, for example, provide a very good power to weight ratio, and power to cost ratio.

According to one aspect of the present invention there is provided an unmanned vehicle comprising: a fuselage; a propulsion unit engaged with said fuselage, and operable to propel said unmanned vehicle to a desired altitude or location during a firing stage; multiple rotors pivotally engaged with said fuselage; and a rotor positioning system operable to pivot said multiple rotors between a stowed position and a deployed position, the stowed position minimizing drag and instability during the firing stage, and the deployed position allowing the multiple rotors to control the position and altitude of the unmanned vehicle.

According to another aspect of the present invention there is provided a method of operation for an unmanned vehicle, comprising the steps of: positioning multiple rotors, pivotally engaged with a fuselage, in a stowed position which minimizes drag and instability during a firing stage; igniting a rocket engaged with said fuselage, to propel said unmanned vehicle to a desired altitude and/or location during the firing stage; pivoting said multiple rotors to a deployed position; and energizing the multiple rotors to control the position and altitude of the unmanned vehicle.

According to a further aspect of the present invention, the unmanned vehicle may also include features supporting operation underwater and on the surface of the water. In combination with other aspects of the invention, the unmanned vehicle may switch between any pairing of: rocket propelled vertical flight, propeller driven vertical flight, rocket propelled horizontal flight, propeller driven horizontal flight, water surface operation and underwater operation. For example, the unmanned vehicle flying as a drone, may seek refuge underwater to avoid detection or attack. Just as easily, the unmanned vehicle could be launched from the ground as a drone and then use rocket propelled horizontal flight as an evasive measure.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other features of the invention will become more apparent from the following description in which reference is made to the appended drawings wherein.

DETAILED DESCRIPTION

One or more currently preferred embodiments have been described by way of example. It will be apparent to persons skilled in the art that a number of variations and modifications can be made without departing from the scope of the invention as defined in the claims.

Figure 3:
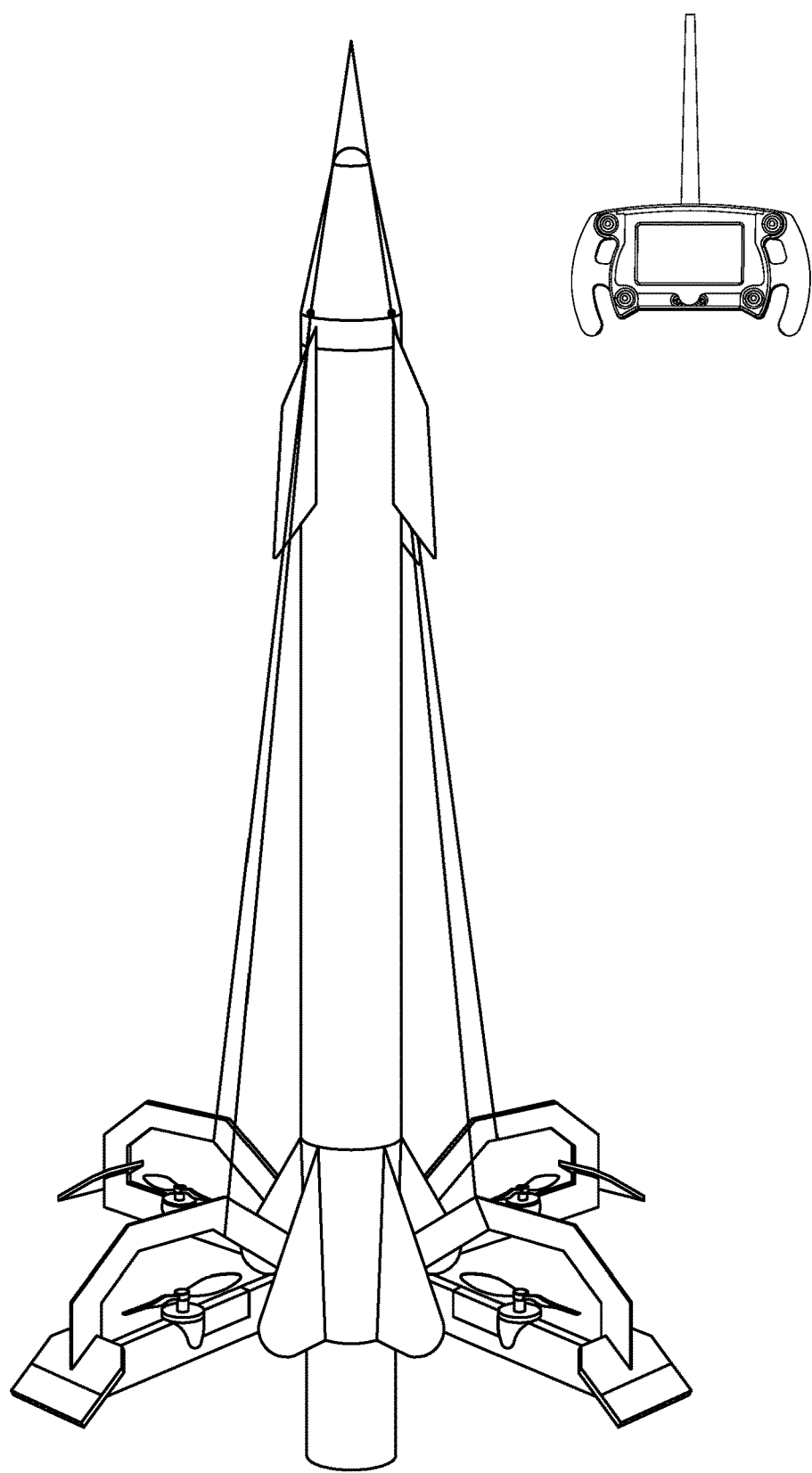
FIG. 3 presents a simplified schematic diagram of a rocket drone in an embodiment of the present invention.

FIG. 3 presents a simplified arrangement of a rocket propelled drone in an exemplary embodiment of the invention. The primary elements of the rocket propelled drone are the fuselage, the multiple rotors which provide the drone functionality, the rotor positioning system, the cone, the tail fins, the nose fins and the wireless remote controller. The rocket propelled drone also, of course, includes a propulsion unit inside the fuselage, which is not visible in FIG. 3.

Figure 17:
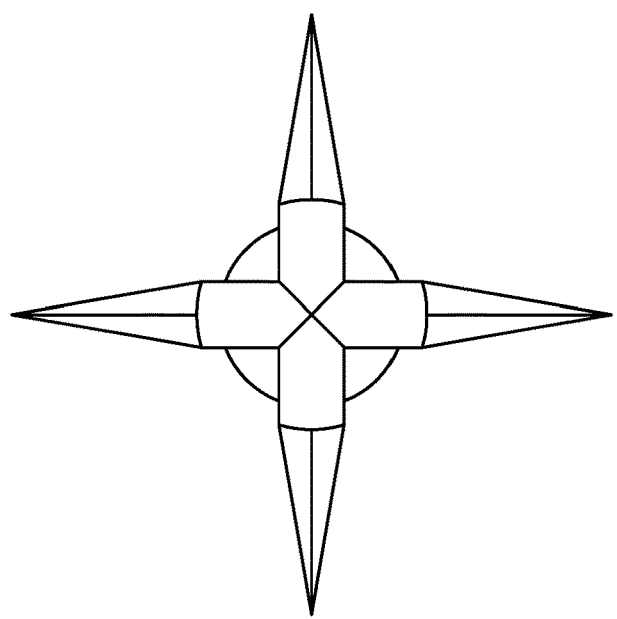

Various embodiments of the drone rocket are described herein. For example, while FIG. 3 presents an embodiment with a single set of wings/rotor assemblies, other embodiments may comprise two or more sets of wings/rotor assemblies. The first set may be approximately in line with the electrical components of the drone, near the bottom of the drone rocket while in the vertical position (i.e. 'fin rotors'), which is the case with the single set of four wings/rotor assemblies in FIG. 3. The second set may be closer to the nose of the rocket drone (i.e. forward wing rotors), placed higher that the first set, while the drone is in the vertical position. The second set of wings/rotor assemblies may be used primarily for horizontal flight. Each set of wings/rotor assemblies may comprise two or more wings/rotor assemblies. In a preferred embodiment, the first set of wings comprises four wings/rotor assemblies placed at the same level and spaced equally (top view shown in FIG. 17), and the second set of wings comprises two wings placed at the same level, higher than the first set and are placed opposite each other, in line with two of the four wings of the first set (see for example FIGS. 19-22). Note also, as shown in FIG. 17, that the electric motors of the propellers can be covered with cowlings, to reduce drag.

The fuselage is the primary structural element to which all of the other components are attached. Model rockets often use a cardboard tube as the fuselage, but the fuselage could be manufactured out of any light and strong material such as polycarbonate, carbon fiber, aluminum, etc. The tail fins and nose fins are attached directly to the fuselage and are often made of the same material to simplify construction and bonding of the materials. The design parameters of the tail fins and nose fins are determined by the specifications and hence the flight dynamics of the fuselage, the weight of the overall rocket drone, and the propulsion unit, using standard rocket design principles. The multiple rotor assemblies and the rotor positioning system of the invention will add some drag, but typically, this is not sufficient to upset the flight dynamics.

The fuselage may store the engine or multiple engines, motors, a GPS, a gyroscope and accelerometer, a parachute, a magnetic switch system, and other rocket and drone components. The present invention may use a single engine or multiple engines. The engines are rocket engines. The motors or actuators may be used for a pivoting mechanism in the rotor assemblies attached to the fuselage and/or the propellers on the wings of the rotor assemblies. A GPS may be used for tracking where the rocket propelled drone is and may be used for the safe return of the drone to the launch site. A gyroscope and/or accelerometer may be used in the rocket propelled drone for stability, and a parachute may be incorporated to aid in keeping the drone at a particular height during horizontal drone type flight and for safe return of the drone after use. A magnetic switch system may be incorporated for use during the transition between horizontal and vertical flight or stowed and deployed/drone positions.

Figure 18:
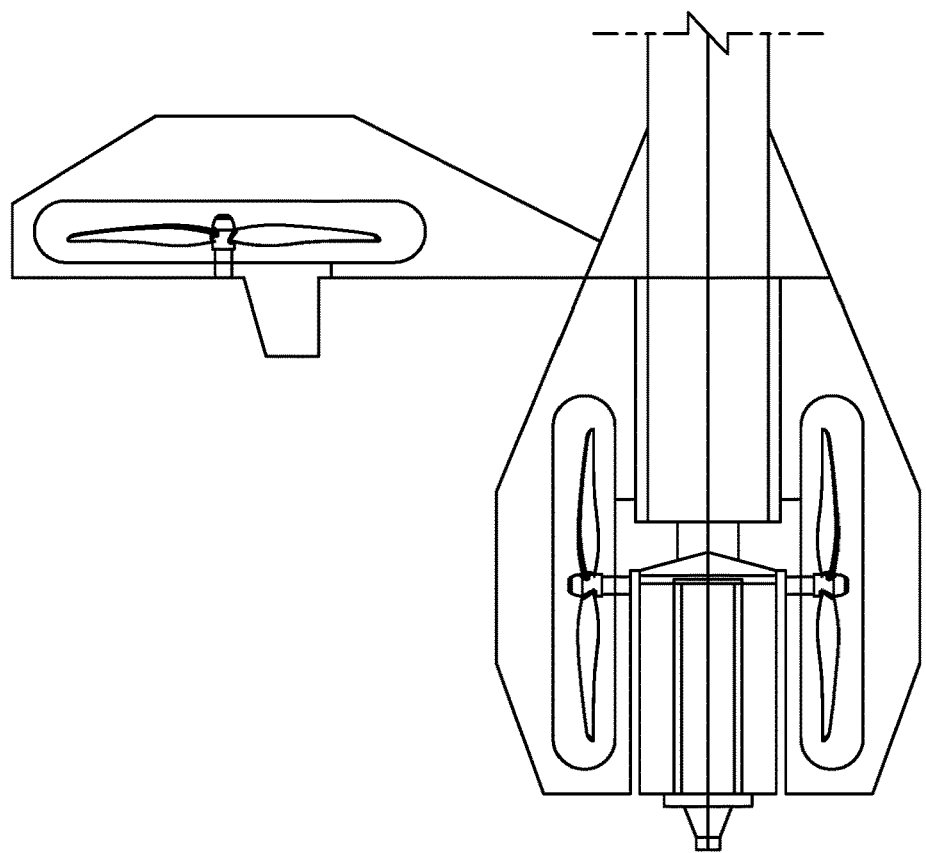
FIG. 18 presents the wings of the drone in stowed and deployed positions.

As depicted in FIG. 3, each of the multiple rotor assemblies comprise a pivotable wing and a propeller. The wings of the multiple rotor assemblies are pivotally engaged with the fuselage, so they can be positioned in one of two orientations: the stowed position (rocket firing position) as shown in FIGS. 5 and 18, and the deployed position as show in FIGS. 3 and 4, and in FIGS. 5 and 18 as the drone or flight position. The mechanism for pivoting of the wings from the stowed position to the drone position may be effected in various ways, for example, the rotor assemblies may be sandwiched between two layers of tail fin type material. In this way, the pivoting mechanism and the rotor assemblies do not add significant drag, and stability is provided.

Figure 4:
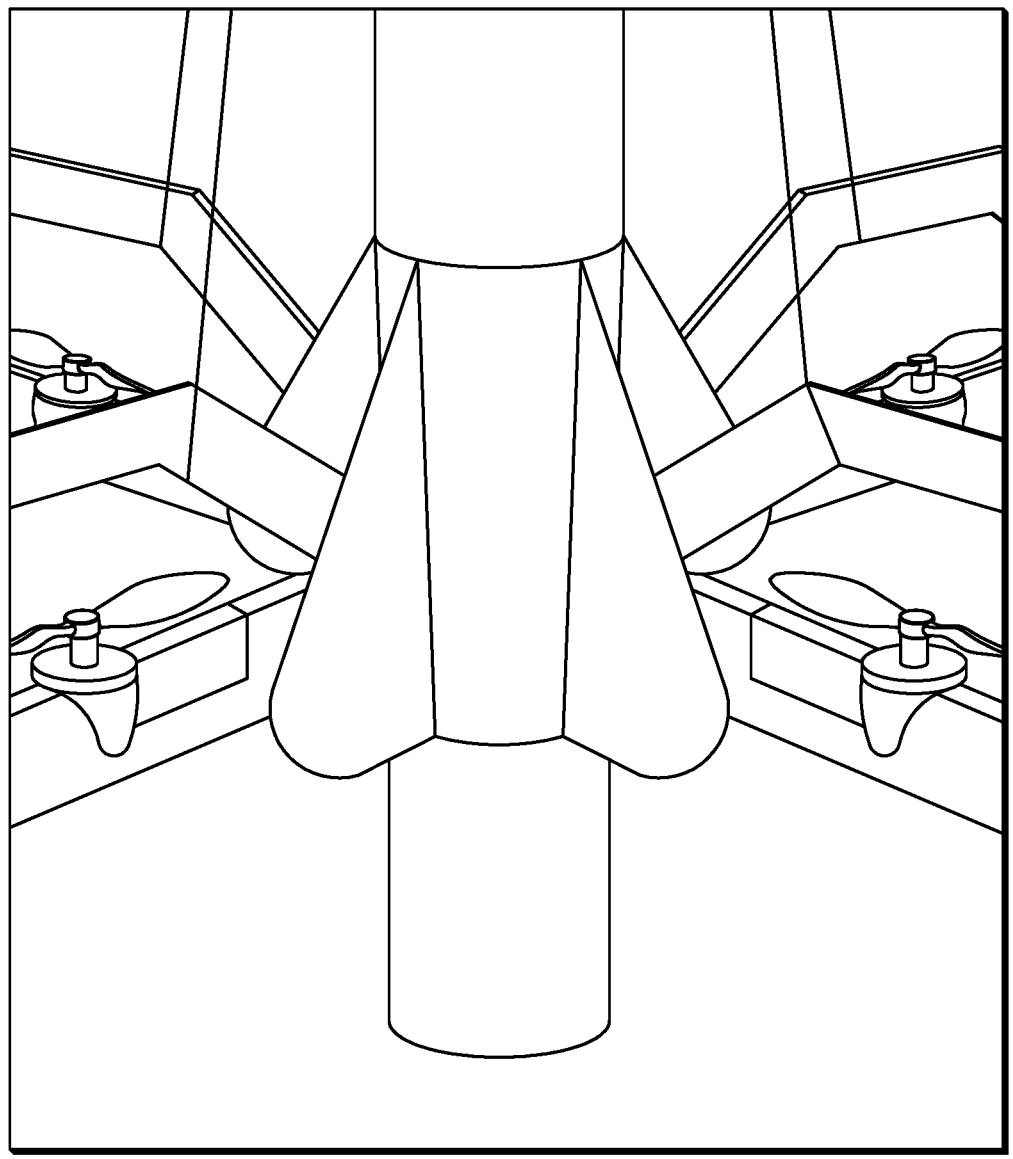
FIGS. 4, 4A and 4B present an enlarged detailed view of the propeller components of FIG. 3 in accordance with an embodiment of the present invention.
Figure 5:
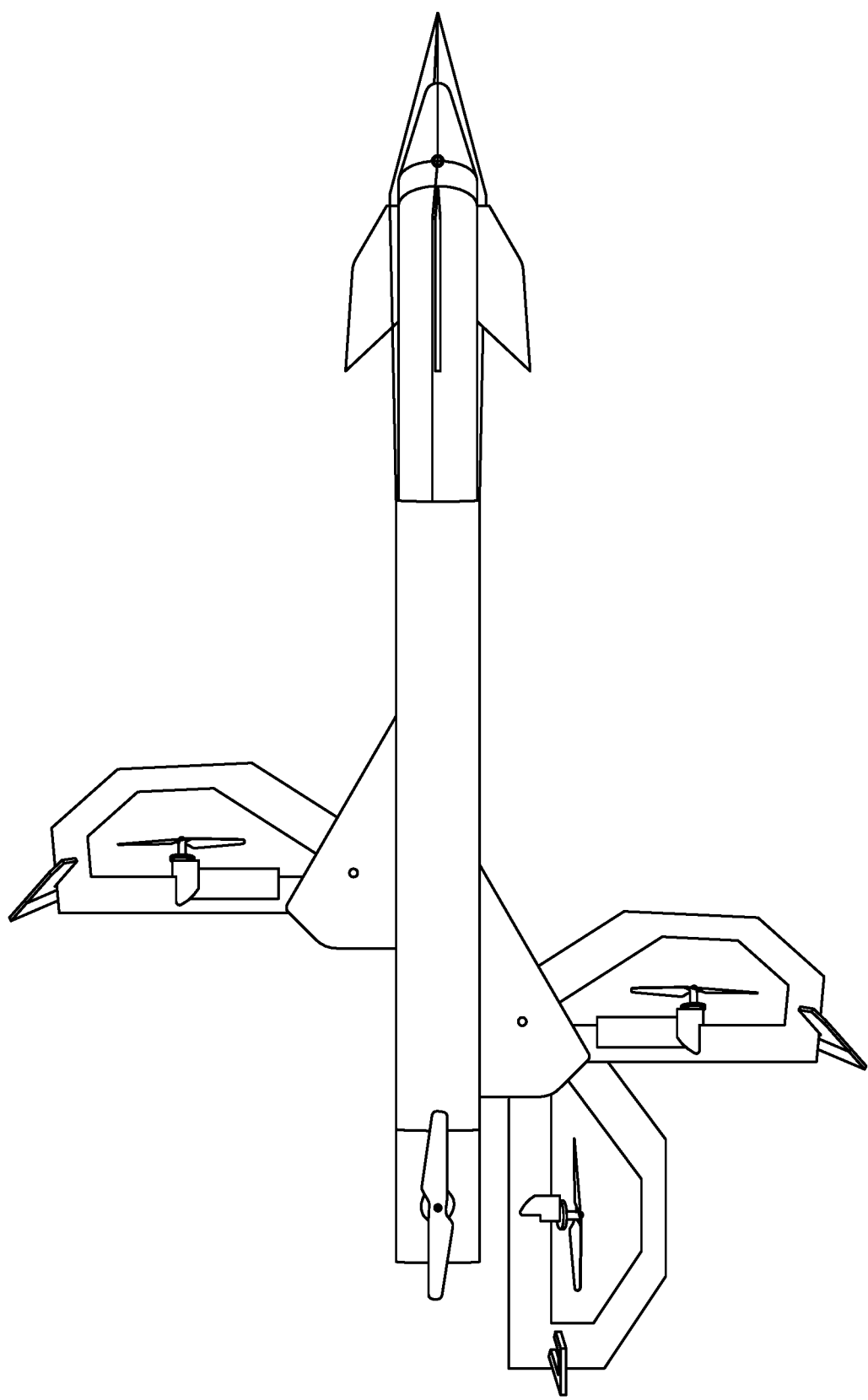
FIG. 5 presents the drone of FIG. 3, showing the propellers in stowed and deployed positions.
Figure 6A:
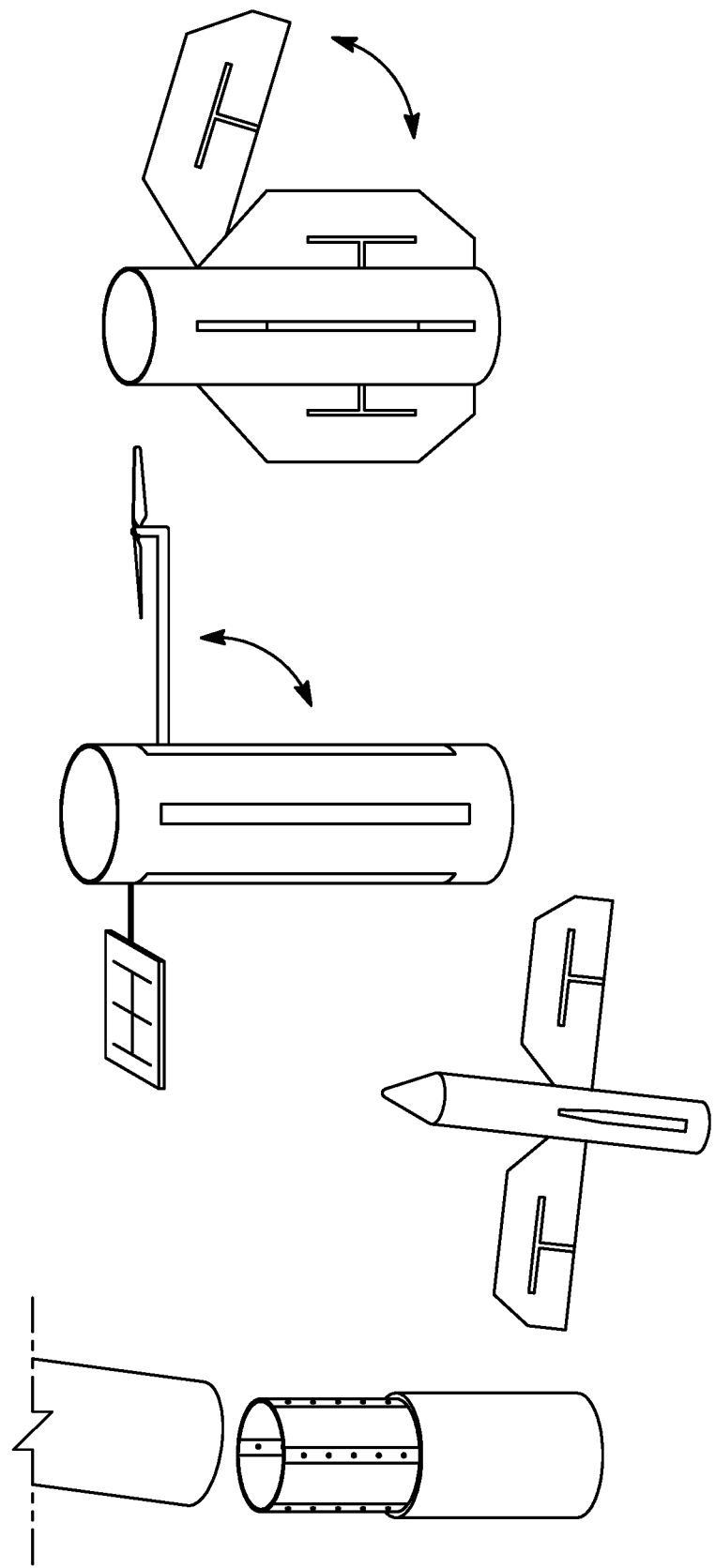
FIG. 6A presents a method of transitioning the wings of the rocket drone from stowed to deployed positions with a magnetic switch.
Figure 6B:
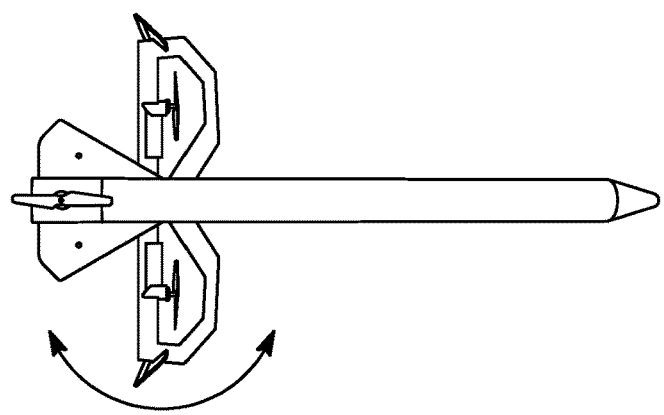
FIG. 6B presents the drone rocket during horizontal flight.
Figure 6C:
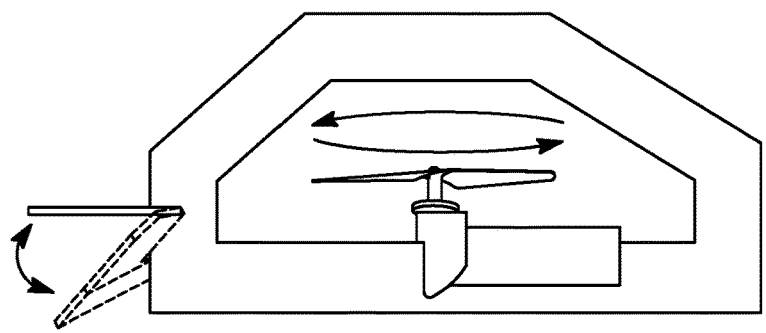
FIG. 6C presents details of the propellers.
Figure 6D:
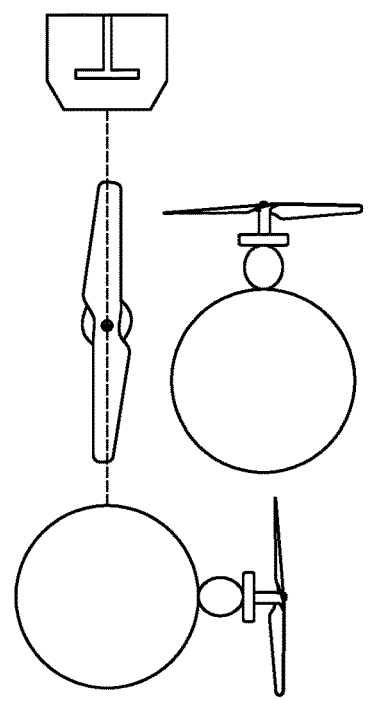
FIG. 6D presents the top view of the drone rocket while the propellers are in the deployed positions.
Figure 7:
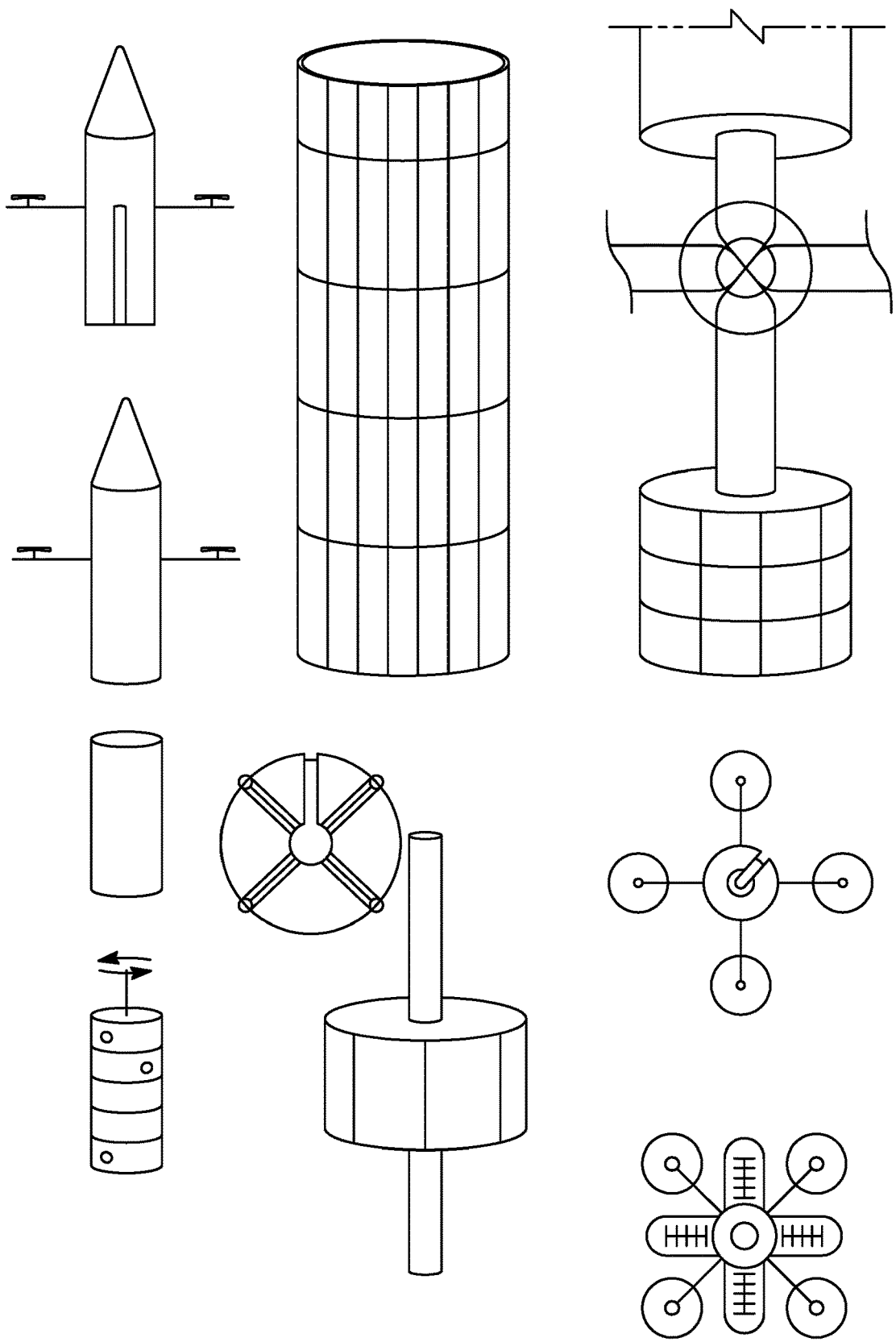
FIG. 7 presents additional details of the design.

Note that the end of each rotor assembly an additional fin is included, positioned at an angle of 45 degrees to the main axis of the fuselage (see FIGS. 4 and 6C). These fins 'cup' the air after apogee has been reached, directing air into the rotor assemblies and improving stability.

Figure 14A:
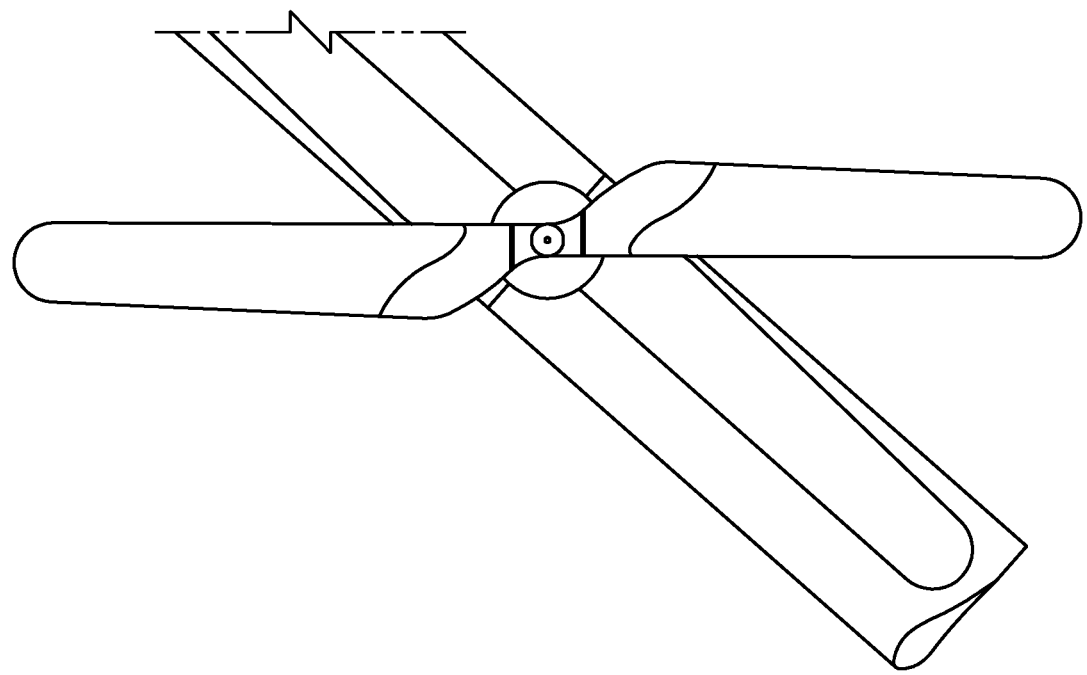
FIGS. 14A and 14B present top views of the propeller while in the deployed position, FIG. 14A with the propeller in a running position, and FIG. 14B with the propeller in the pinned position.
Figure 14B:
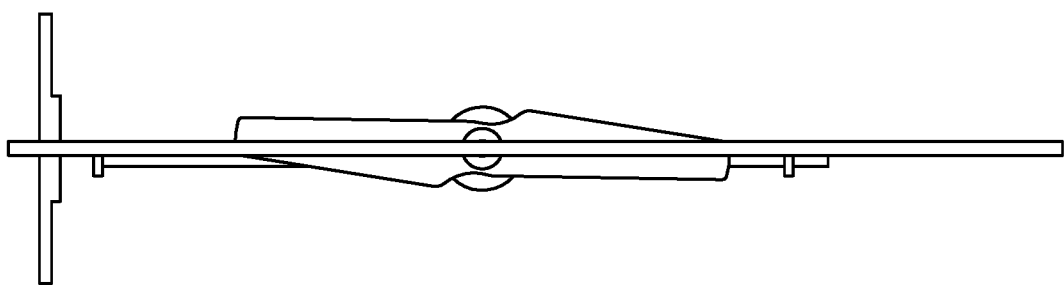

When the multiple rotor assemblies are in the stowed position, the plane of the rotors lie in the direction of flight, so drag is minimized. While propellers with multiple blades may be used, it is preferable to use propellers with two blades (shown in FIGS. 14A and 14B). The arrangement of FIGS. 5 and 18 allow the long dimension of the two-blade propellers to be kept in line with the direction of flight (per FIG. 14B) by actuatable pins projecting outwardly from the body of the fuselage, further reducing drag and minimizing possible disruption to the flight dynamics. Note also in FIG. 18 that the rocket motor comprises the rectangle in the lower portion of the fuselage. Space is available in the fuselage above the rocket motor, so the electric motors of the multiple rotor assemblies can be tucked into the fuselage while in the stowed position.

When the multiple rotor assemblies are in the deployed position, they are in the usual operating position for providing drone functionality. In a quadcopter-type implementation of the invention as shown in FIG. 3, the four rotors are all in the same plane, the plane being perpendicular to the main axis of the fuselage. The electronics and batteries to operate and power the multiple rotor assemblies can be positioned in the fuselage at a height near the plane of the while they are in the deployed position.

Figure 11:
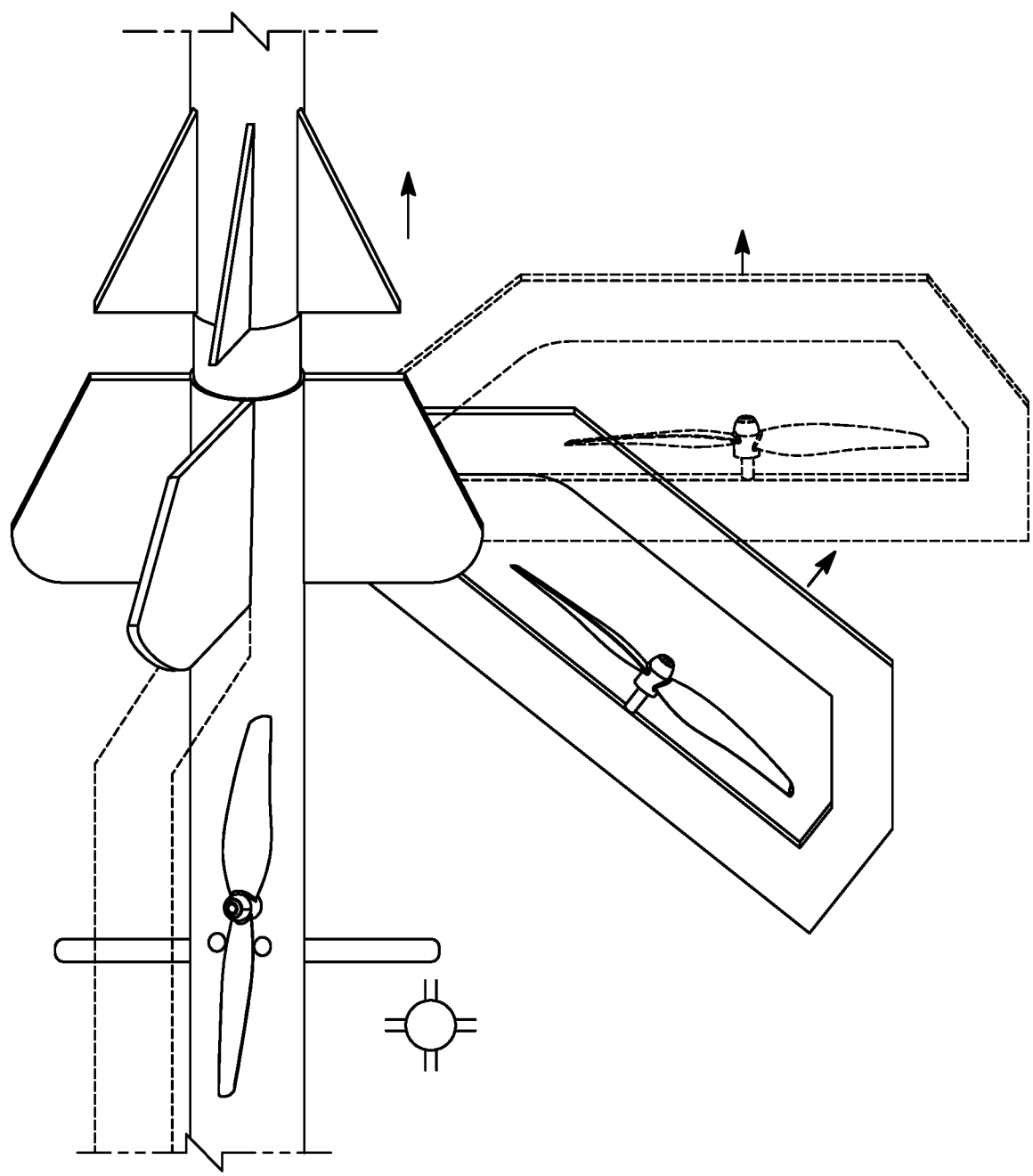

As described above, the rotor positioning system is operable to pivot the multiple rotors between the stowed and deployed positions. In FIGS. 3 and 11, a set of strings is used to deploy the rotor assemblies, having one end fixed to an extremity of each rotor assembly, and the other end attaching at a parachute cone or at the top of the fuselage before the parachute cone. The parachute cone is just above the nose fins of the fuselage and the parachute cone may be used to deploy the rotors into the drone/deployed position. When the rocket engine propellant is exhausted and the rocket drone reaches apogee, a second charge may be fired within the rocket engine (i.e. the ejection charge), in an upward direction. This second charge forces the parachute and parachute cone to be released from the top of the fuselage. The expelled parachute cone applies a force on the string system, deploying the rotor assemblies. The strings in FIG. 3 can be protected and guided with tubular guides, eye screws, etc.

Another method of deploying the rotor assemblies includes a magnetic switch. When the rocket propelled drone reaches apogee, the ejection charge would force the telescopic fuselage to expand where the magnetic switch is located (see FIGS. 6A, 8 and 9B). The magnetic switch would activate the pivoting mechanism electrically and the rotor assemblies would then be deployed into the drone or deployed position. Note that a guide rail can be used to keep the magnet on one part of the telescopic fuselage aligned with the magnetic switch on the other part.

In an exemplary embodiment of the rocket propelled drone, the electronics module to control and power the drone may be inserted into the fuselage, immediately above the rotor assemblies and the rocket engine. To allow pressure from the rocket engine to expel the parachute and cone, passageways may be fashioned to allow gas and pressure to pass around the electronics module. The cross-sectional area of these passageways is approximately four times the area of the top of the rocket engine.

The rotor positioning system may also be effected in many other ways, for example, a two part, telescopic fuselage may be used with the string system fixed to an upper portion of the fuselage, rather than having the string system actuated by the cone (see FIG. 11). When the second charge is fired within the rocket engine, the fuselage would expand in a linear direction, drawing the strings and deploying the rotor assemblies as described above. Another example may be the multiple rotor assemblies being driven to the deployed position using springs where the springs are held in a stowed position until an actuatable pin releases them. In another example the rotor assemblies may be driven to a deployed position using a servo motor or they may be driven to a deployed position using a solenoid.

Any of the above examples may be actuated using a timer, a wireless remote control, or a sensor which may detect the ignition of the second charge. A magnetic switch, for example, may be placed on the cone or on an expanding section of the fuselage, detecting when the cone has been released or the fuselage has expanded, to activate the pivoting mechanism and pivot the multiple rotor assemblies into the drone/deployed position. Other mechanical, electrical or electromechanical implementations may also be used.

Once the rotor assemblies are deployed, they can be energized, allowing the user to control the location and altitude of the rocket propelled drone via a wireless remote control. Suitable wireless receiver and transmitter components are well known in the art, as are the necessary battery and charger systems.

In the preferred embodiment the initial propulsion unit is a solid fuel rocket engine, but other engines may also easily be used, such as reusable solid fuel rocket engines, liquid rocket engines, turbines, etc. Solid fuel rocket engines are particularly useful because they are comparatively inexpensive, widely available, and provide a good power to weight ratio.

The rocket propelled drone may have multiple rocket engines. The rocket propelled drone may reach a targeted height where the multiple rotors are pivoted to the deployed/drone position and the device may perform drone type flight in a horizontal direction (shown in FIG. 12B). A new target height may be desired for the rocket drone that is higher than the current target height, and so the device may activate the pivoting mechanism to pivot the multiple rotors back into the stowed position. This would allow for a second rocket propulsion.

In fact, the rocket drone described herein may be configured to provide any combination of transitions to and from vertical and horizontal flight, and/or between rocket and drone (propellor) propulsion. While most of the embodiments described herein consider the scenario of the rocket drone launching vertically with rocket propulsion, the opposite could easily be done. That is, the rocket drone could launch as a drone, and then ignite the rocket motor once a particular location and/or orientation has been reached. This could be useful, for example, if the rocket drone was being launched in a forested or crowded area where the drone operating mode would provide finer user control and obstacle-avoidance functionality needed to avoid trees, power lines and other hindrances. Once those obstacles have been cleared and open air space has been reached, the user could orient the rocket drone in a desired manner and ignite the rocket motor to deliver the rocket drone quickly to a specific location.

Note that the rocket propelled drone may be implemented with or without a parachute. With a parachute, a light-duty drone system may be used, and the system would slowly drop back down towards Earth, in a controlled way. Without a parachute, a more powerful drone would be required. The rocket propelled drone may have a GPS or other control system to aid in returning the device to the launch site, particularly when there is no parachute.

Horizontal Flight

Figure 19:
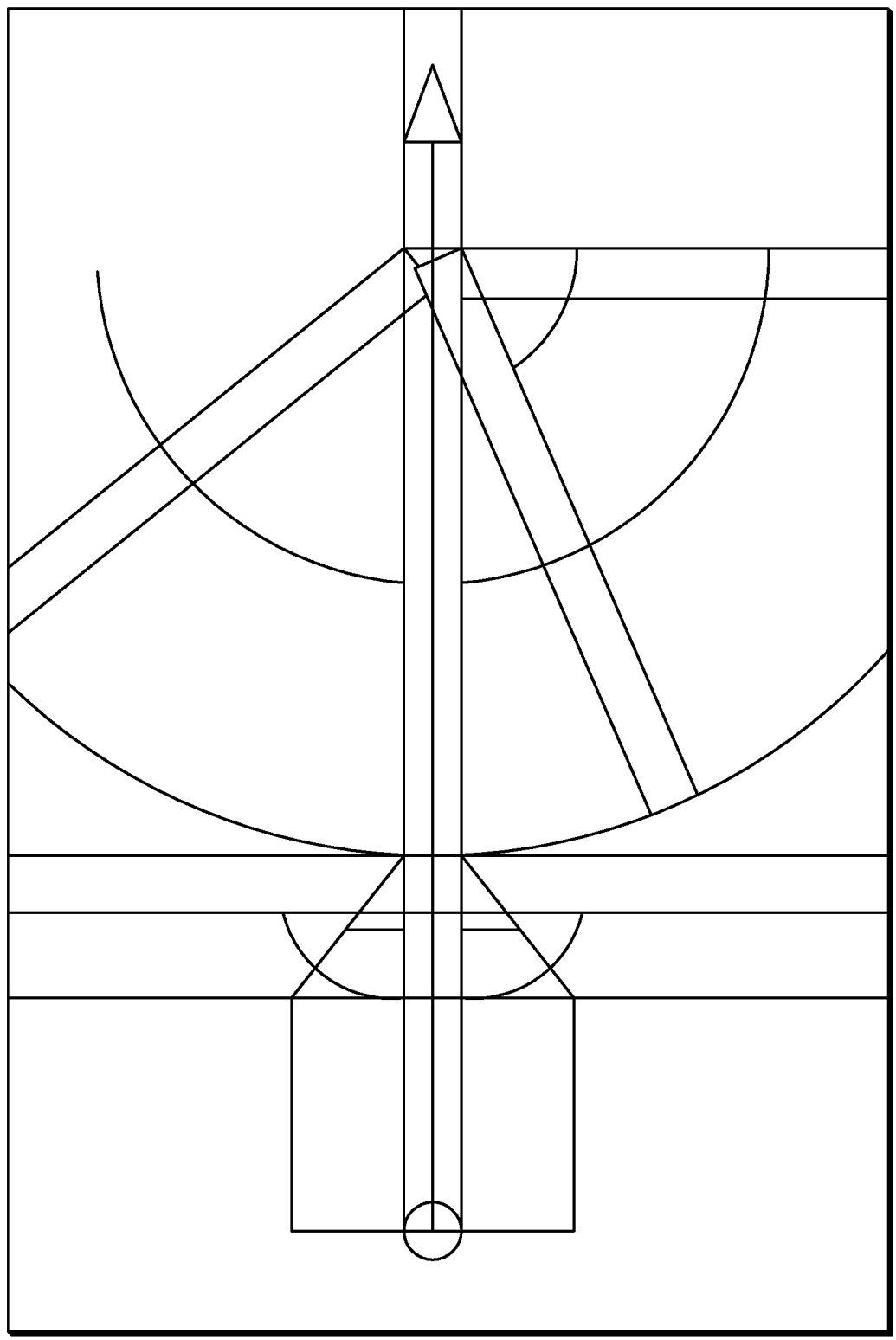
FIG. 19 presents the movement of the secondary drone rocket wings.
Figure 20:
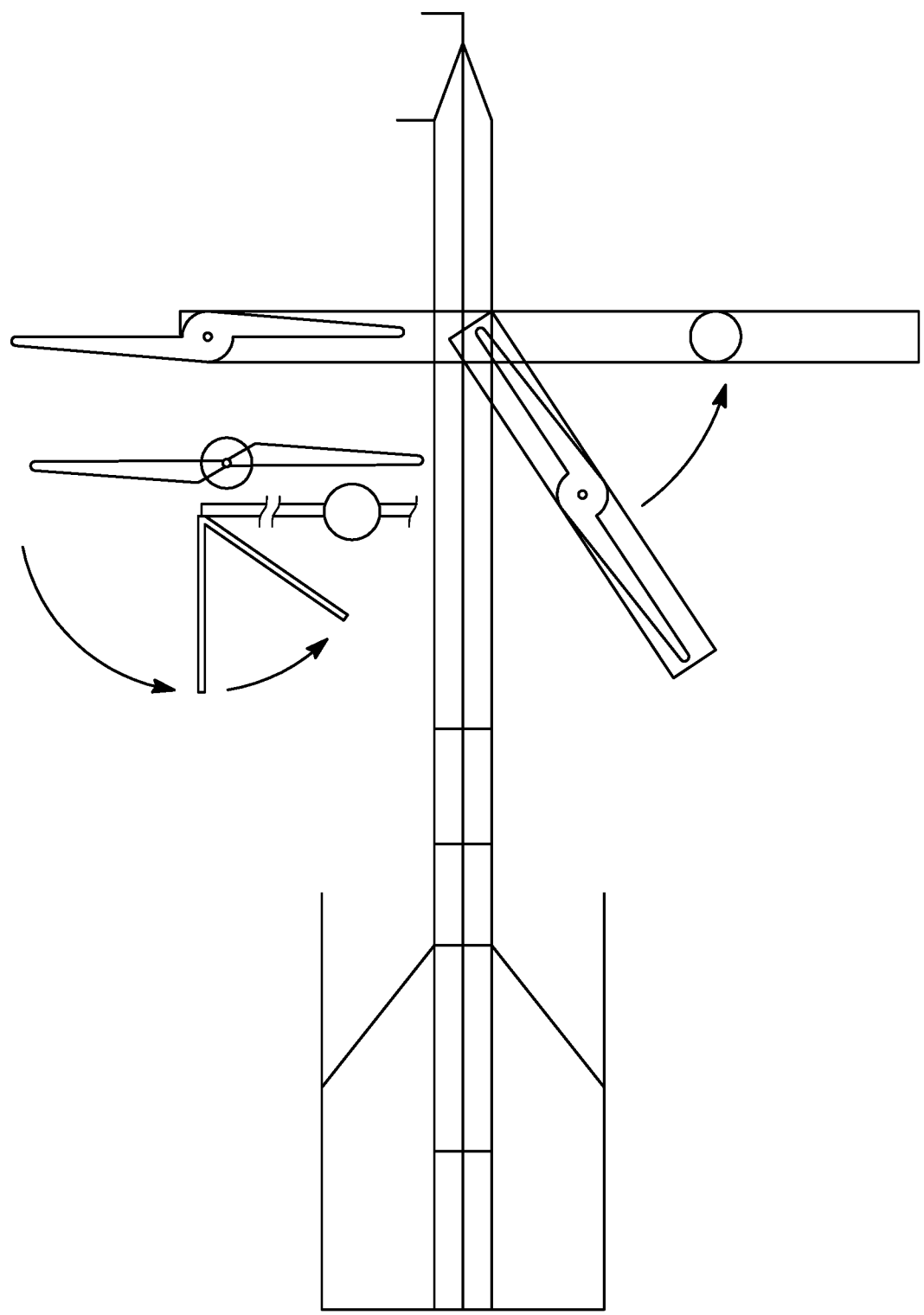
FIGS. 20 to 22 present the movement of the secondary drone rocket wings from the stowed to deployed positions.
Figure 21:
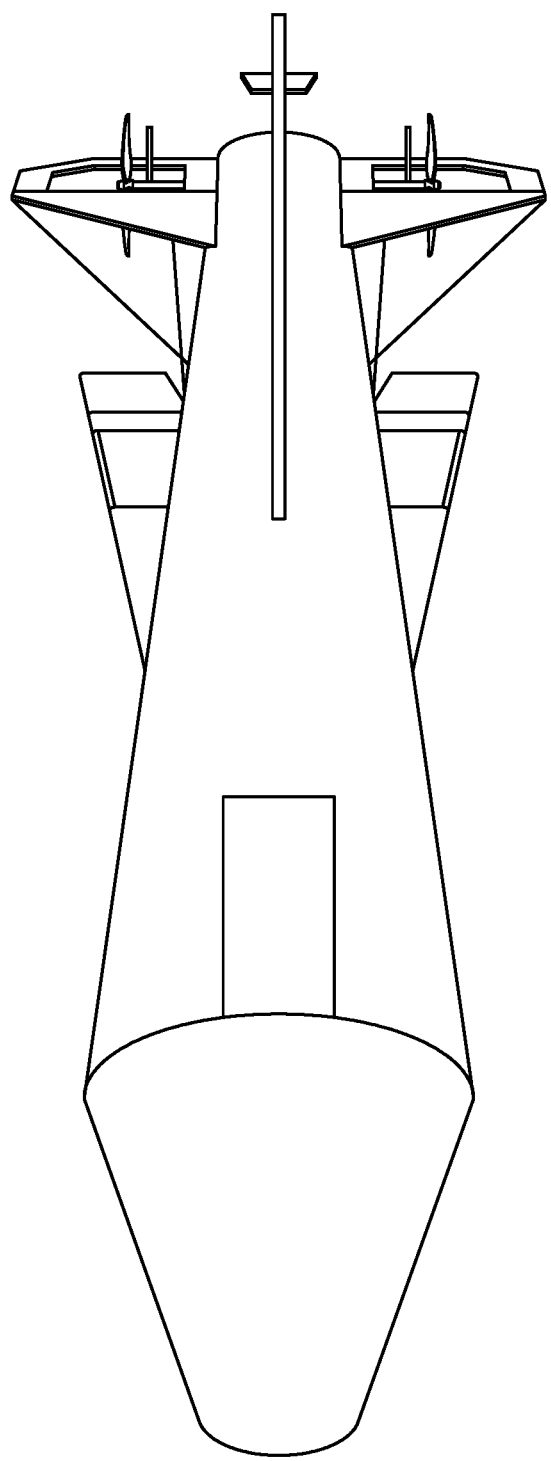

In an embodiment, the rocket drone may have two sets of wings/rotor assemblies, the first set (shown in FIG. 4) primarily used for drone type flight while the drone is in a vertical position, and the second set primarily used for horizontal flight while the drone is in a horizontal position. This would mean that the rocket drone would launch and once it reached a desired height, the first set of wings would deploy to allow for drone type flight while the drone is still in a vertical position. In this case, the second set of wings may also deploy to add increased stability during drone type flight. For horizontal flight, the rocket drone would transition from a vertical position to a horizontal position (shown in FIG. 6B). The second set of wings can be used to control the vertical/horizontal position of the rocket drone. FIGS. 19 and 20 show the second set of wings transitioning into position for drone type flight and/or horizontal flight position. The first set of wings are used in combination with the second set of wings when the rocket drone is in the horizontal position.

To achieve a stable horizontal position during horizontal flight, the two propellers of the second set of wings and the two propellers of the first set of wings that are in line with the second set of wings, rotate 90° in tandem as the drone transitions from vertical to horizontal flight position. The two remaining propellers of the first set of wings do not rotate so that greater forward motion can be provided. Therefore, while in horizontal flight position, the propellers of the second set of wings and the two propellers of the first set of wings in line with the second set are positioned parallel to the horizontal flight direction. The remaining two propellers of the first set of wings are positioned perpendicular to the direction of horizontal flight.

Figure 15:
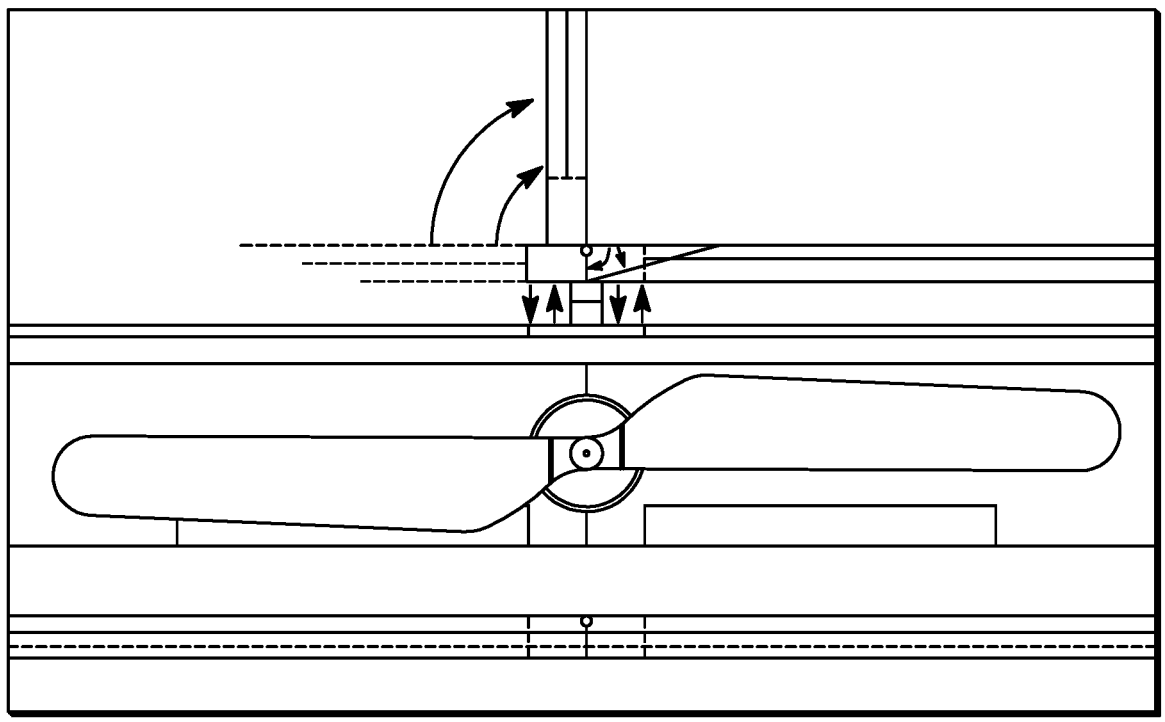
FIG. 15 presents the movement required by the second set of wings of the rocket drone to allow for horizontal flight.
Figure 16:
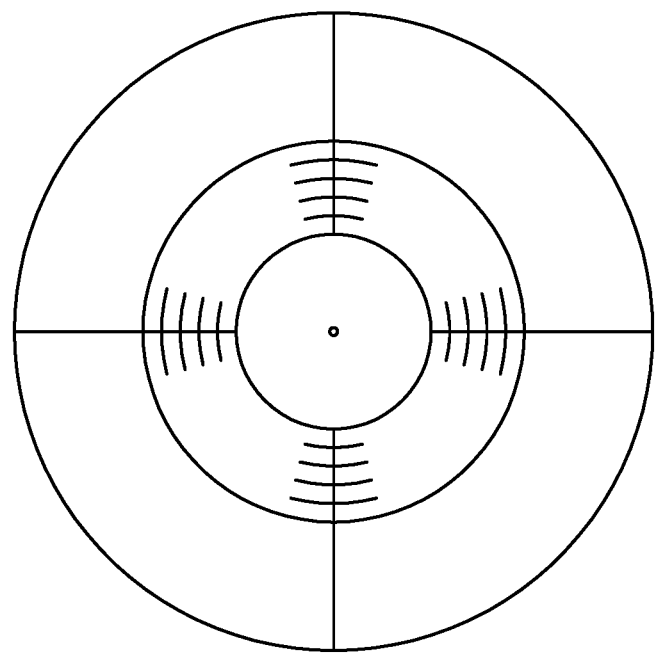
FIGS. 16 and 17 present top views of the rocket drone in the stowed and deployed positions, respectively.

To rotate the propellers of the second set of wings, a section of the wing folds 90° so that the propeller is no longer pressed against the wing. The propellers are then able to rotate 90° so that their axis of rotation is perpendicular to the horizontal flight direction. This transition is depicted in FIG. 15.

By having two propellers at different elevation positions than the other four propellers during horizontal flight position, there is better forward motion and stability control is limited to degrees of linear direction to gain speed. Alternatively, having all propellers at the same elevation position would allow for better control in all axes during lower speed maneuvers. Stability control at lower speeds is easier if the propellers are at the same elevation position, however, stability control at high speeds is better when the two propellers are at a different elevation position.

Figure 4A:
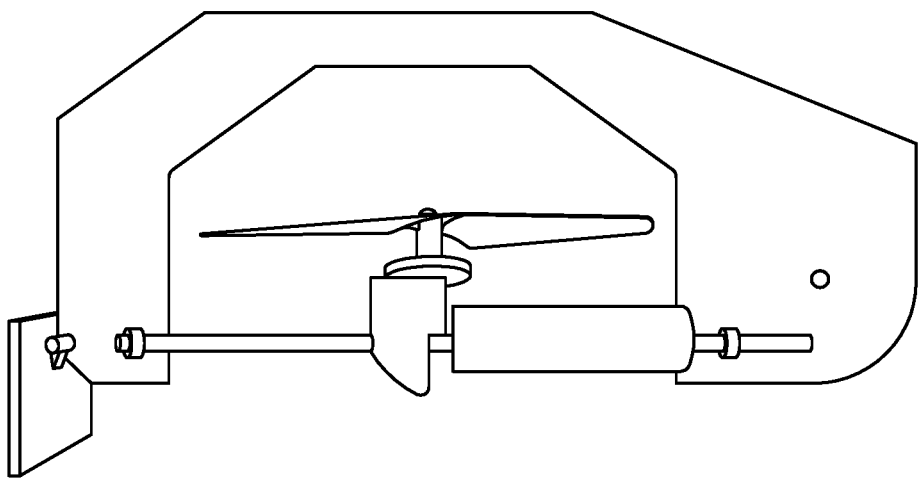
Figure 4B:
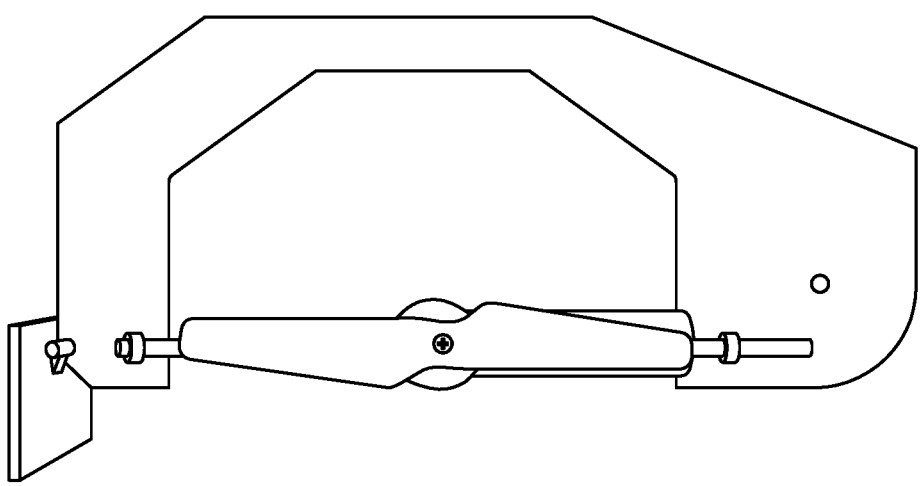
Figure 8:
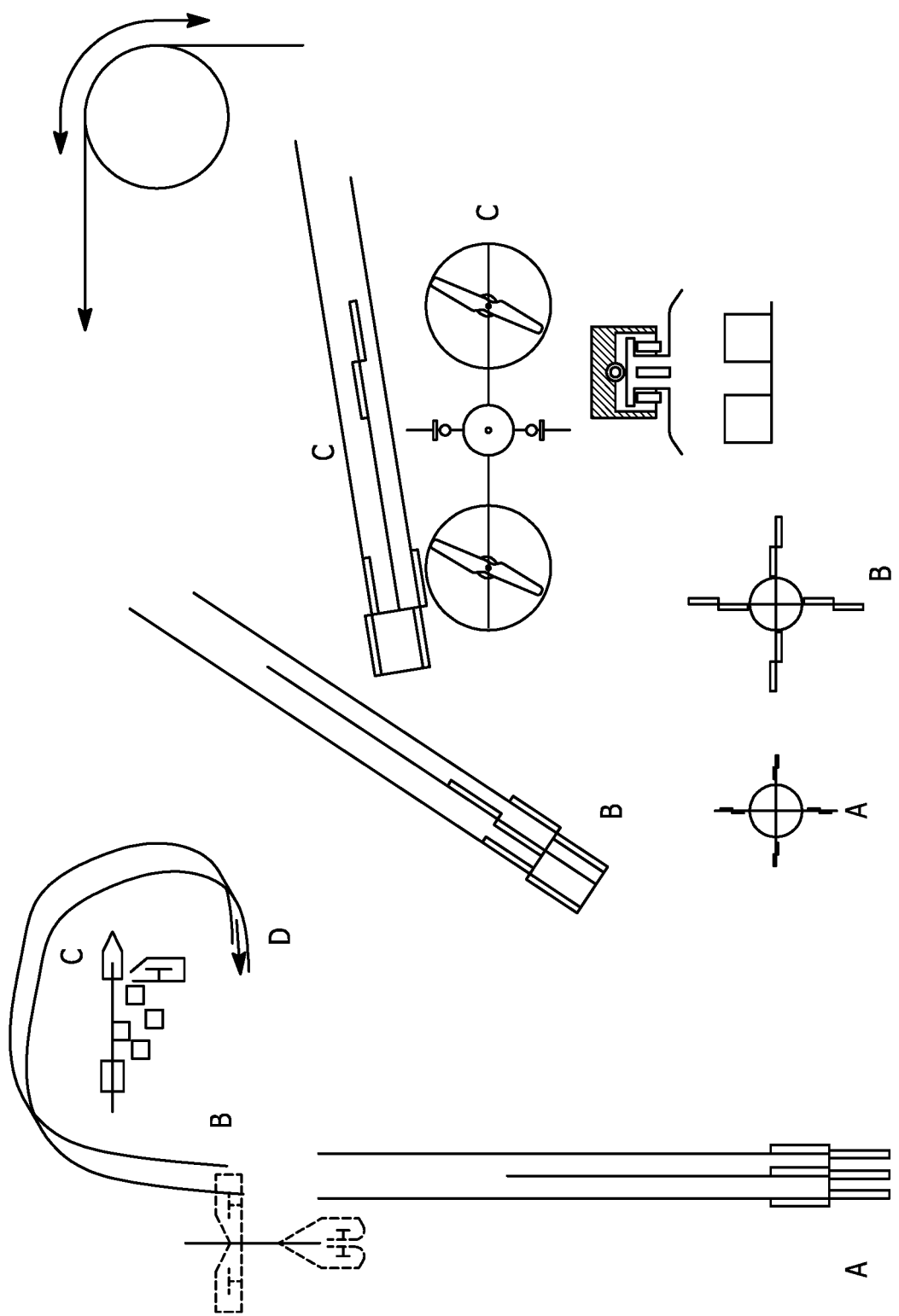
FIGS. 8 and 10 presents a schematic diagram of a drone which can fly in both vertical and horizontal orientations, showing the attitude of the fuselage and the position of the propellers (from the side and top), for the various stages of flight.
Figure 9A:
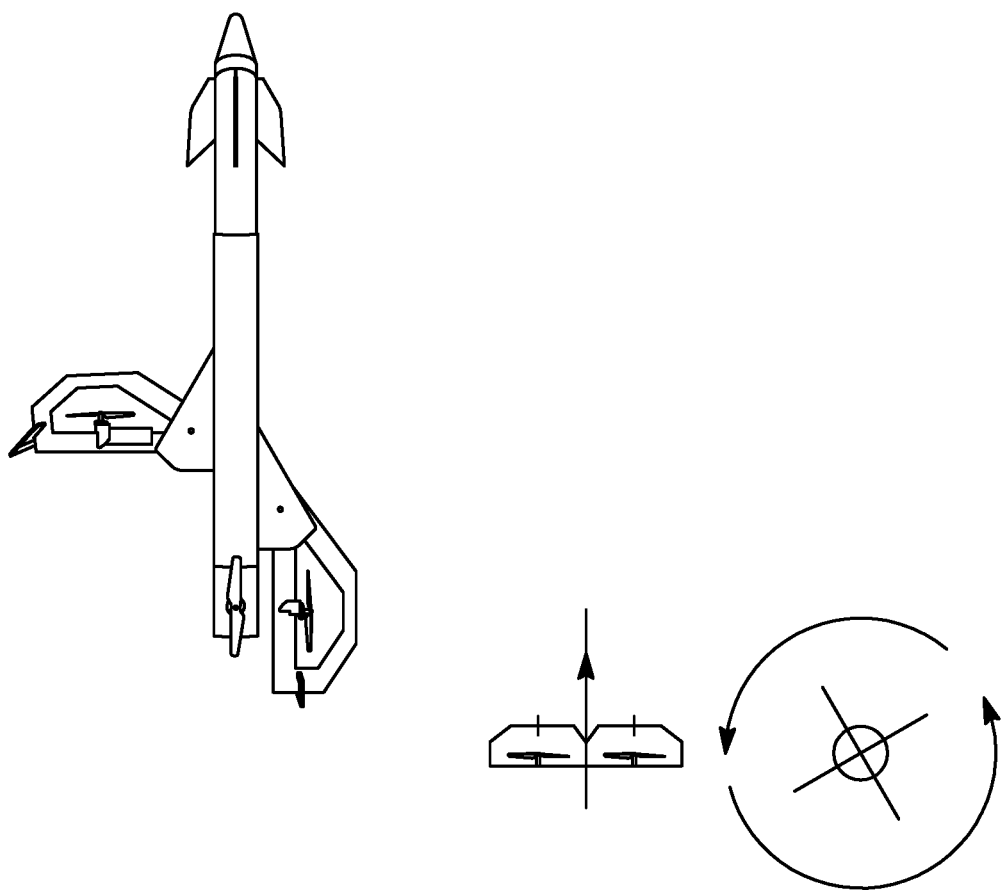
FIG. 9A presents different characteristics of the rocket drone.
Figure 9A:
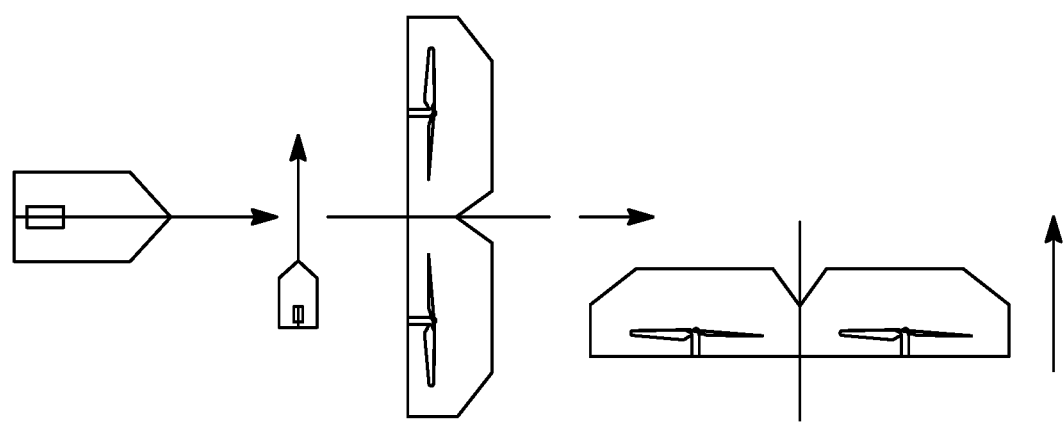
Figure 9B:
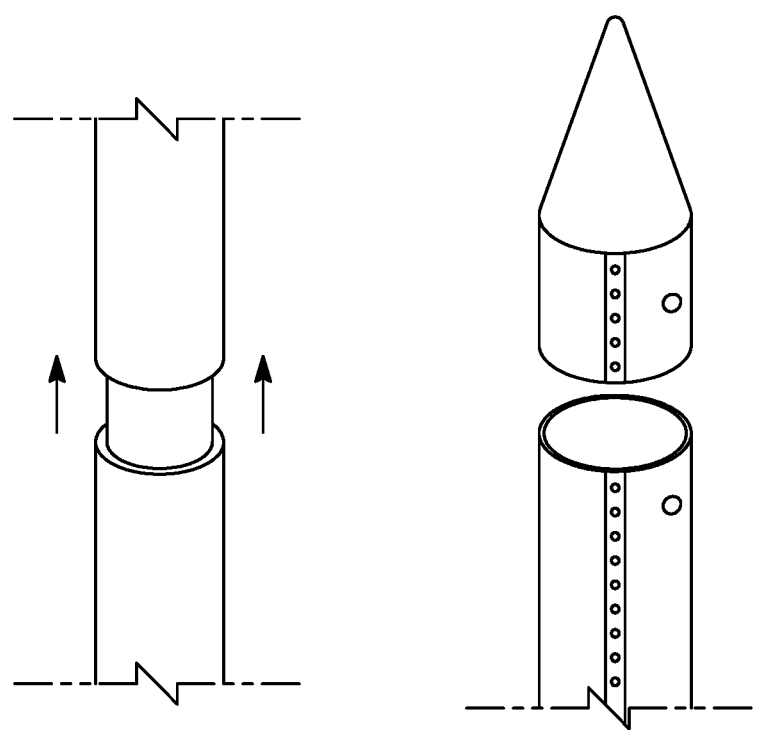
FIGS. 9B, 11 and 12 (A-C) present detailed views of propeller deployment components.
Figure 10:
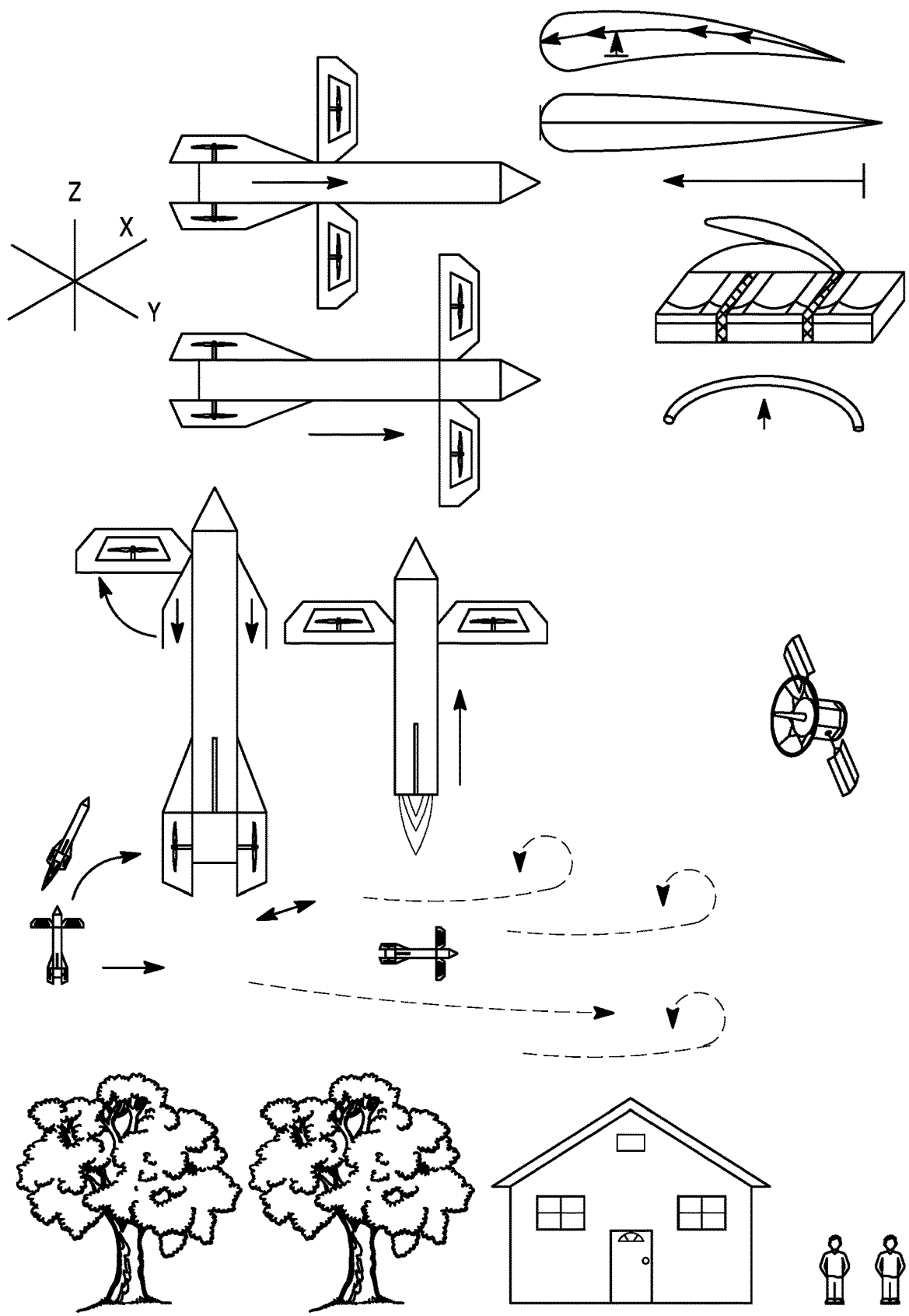

Also, as shown in FIGS. 8 and 10, the drone may be capable of both vertical and horizontal flight. FIG. 8 shows the drone at four stages of an exemplary implementation:

A—launch
B—at deployment of propellers
C—at horizontal flight
D—during recovery/landing For each of these four stages, FIG. 8 shows the attitude of the fuselage, and the position of the rotors/propellers from both the side, and from above (i.e. from the nose of the drone, regardless of the attitude of the fuselage). This embodiment of the drone has upper and lower propellers. While deployed, the upper propellers will typically be in a position where their axis of rotation is the same as the principle axis of the fuselage. The lower propellers typically can be swiveled in this embodiment, so their axis of rotation can either be in line with the principle axis of the fuselage (as shown in FIG. 4A, for vertical flight), perpendicular to it (as shown in FIG. 4B, for horizontal flight), or somewhere between. In short:

| Stage | Attitude of fuselage | Position of propellers | Control notes |
| --- | --- | --- | --- |
| A | vertical | stowed | No control input required, except for launch instruction |
| B | vertical | deployed | Under control by user |
| C | horizontal | deployed | Under control by user |
| D | Vertical or horizontal | deployed | Under control by user, or automatic return under GPS control |

During the launch phase A, the fuselage is in a vertical orientation and the wings are in the stowed position. The rocket engine is ignited and the drone launches. When the propellant is exhausted at stage B, the propellers/wings are deployed, allowing the drone to hover. Both the first and second set of wings may be deployed, or it may just be the first set of wings. At some point the user may wish to switch to the horizontal flight (stage C). To do this, the second set of wings would have to deploy if they had not already. As described above, the axis of the propellers of the second set of wings are actuated to a position in which their axis of rotation is perpendicular to the axis of the fuselage, and the same happens for the axis of the two propellers of the first set of wings that are in line with the second set. The action of swivelling the propellers of the first set of wings will cause the fuselage to tilt from the vertical to the horizontal position because the rotated propellers will simply lift the bottom of the fuselage upwards. That is, contrast FIG. 4A where the propellers in the first set of wings are rotating in an axis that is inline with the primary axis of the fuselage, as opposed to FIG. 4B where the propellers in the first set of wings have been swivelled so that they are perpendicular to the primary axis of the fuselage. In this orientation, the drone is able to fly horizontally, in a horizontal orientation. The recovery/landing stage D can be effected in either a vertical orientation, landing like a helicopter, or in a horizontal orientation, landing like an airplane wherein the second set of wings may be folded to act as legs for landing.

As will be explained below and would be clear to a person skilled in the art, active control is necessary throughout any drone flight, and the technology is available to do this. While the stages outlined above, of transitioning from vertical to horizontal flight, may seem like a major stability and control problem, existing control systems can handle this scenario. Similarly, existing control systems can handle other related flight adjustments such as the changes in center of pressure and center of gravity as propellant burns, as forward wings are deployed and/or stowed, etc. In all cases, the changes in the flight parameters occur in relatively narrow and easily determined ranges, so calculations of the minimum and maximum conditions are easily determined.

Typically, the 2 fin rotors that are inline with the 2 forward wing rotors will be configured to pivot in tandem with each other when control is diverted from using all 4 fin rotors, while in the vertical orientation, to horizontal flight orientation. To achieve a stable vertical orientation, all 4 fin rotors and the 2 forward wing rotors face the same direction, operating parallel to the fuselage, keeping the rocket standing straight. To achieve a stable horizontal orientation, the 2 wing rotors and the 2 fin rotors inline with each other, swivel 90° in tandem as the rocket transitions from vertical to horizontal flight orientation. The 2 remaining fin rotors remain inline with the fuselage to provide greater forward propulsion. See FIG. 23H.

Figure 23A:
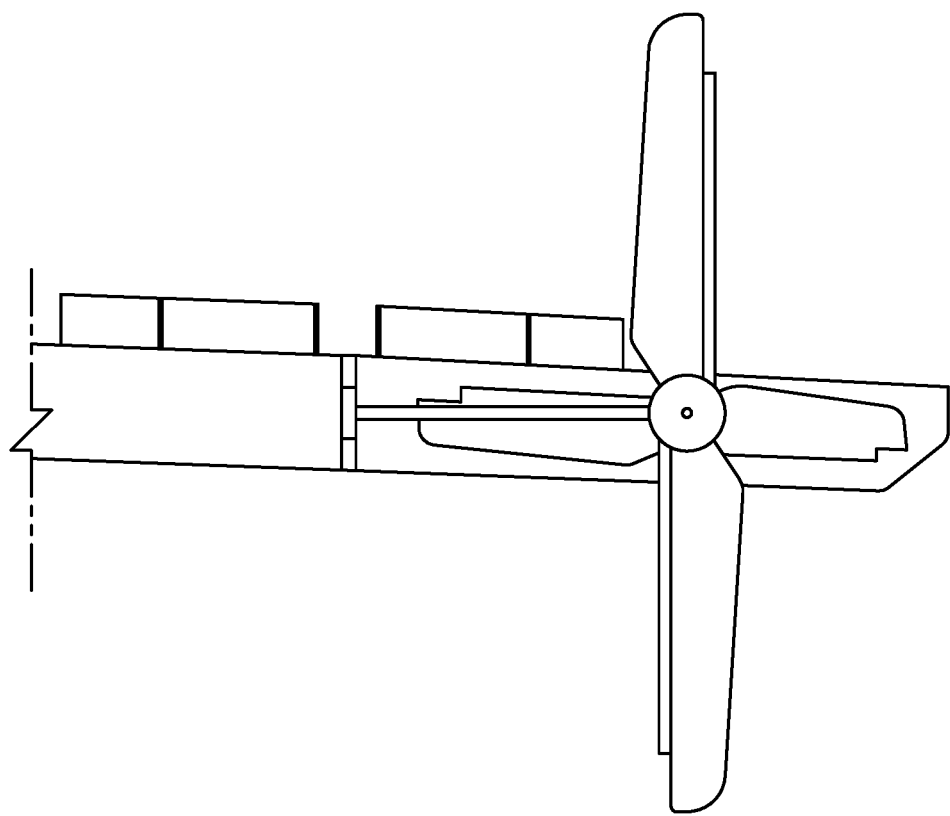
FIGS. 23A to 23J present various views of a second set of wings/rotors which can be positioned towards the top of the fuselage. In this embodiment the forward wing design employs a rotor that is concealed within the wing and extendable flaps that add wing surface area and directional control. The folded section of the wing also acts as legs for landing.
Figure 23B:
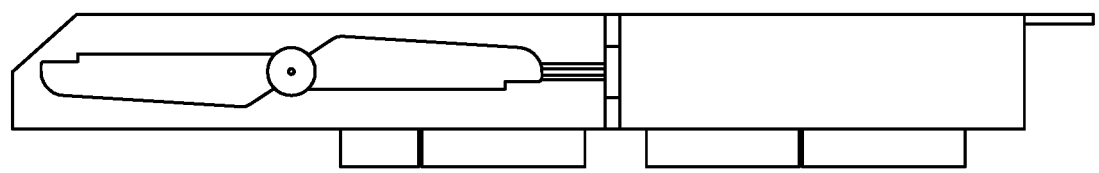
Figure 23C:
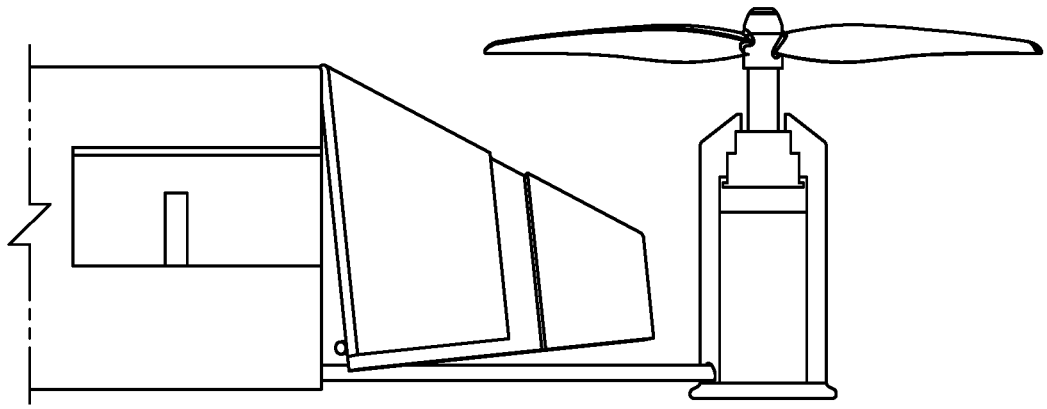
Figure 23D:
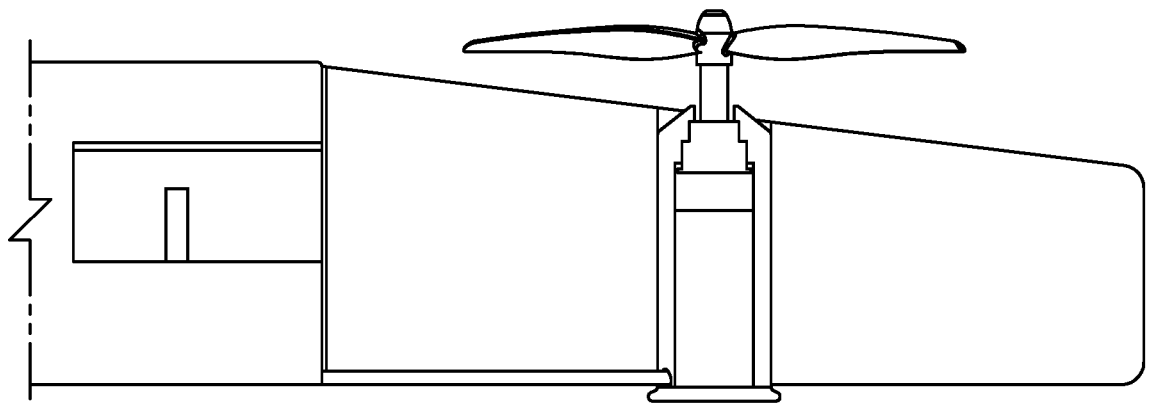
Figure 23E:
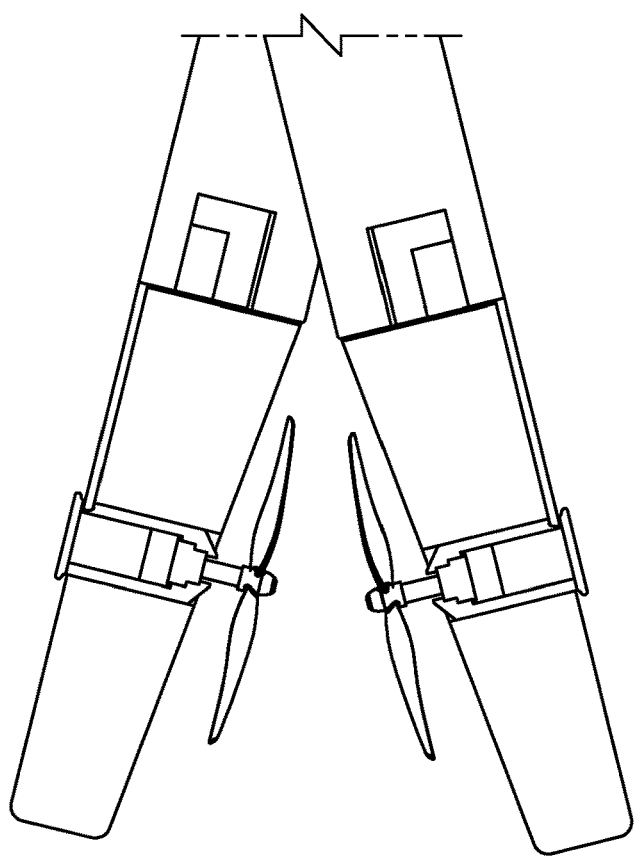
Figure 23F:
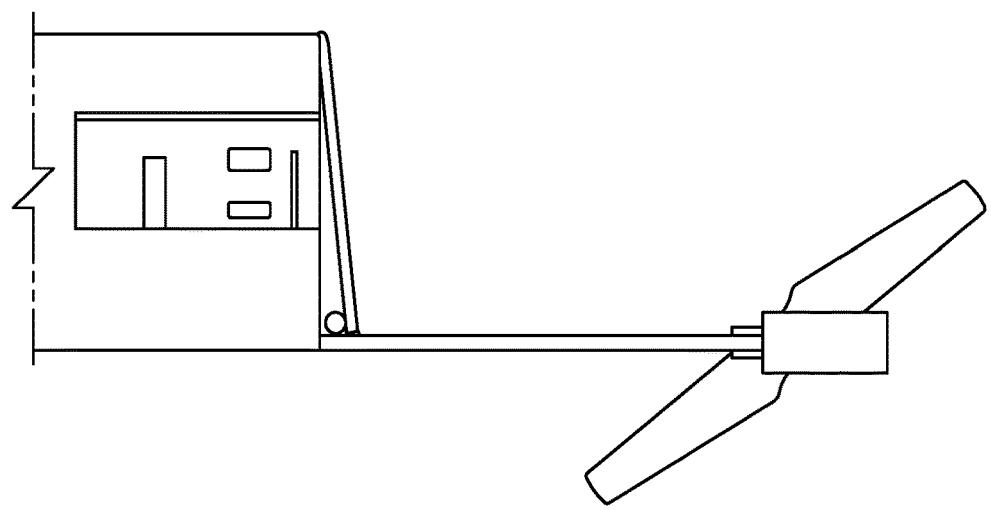
Figure 23G:
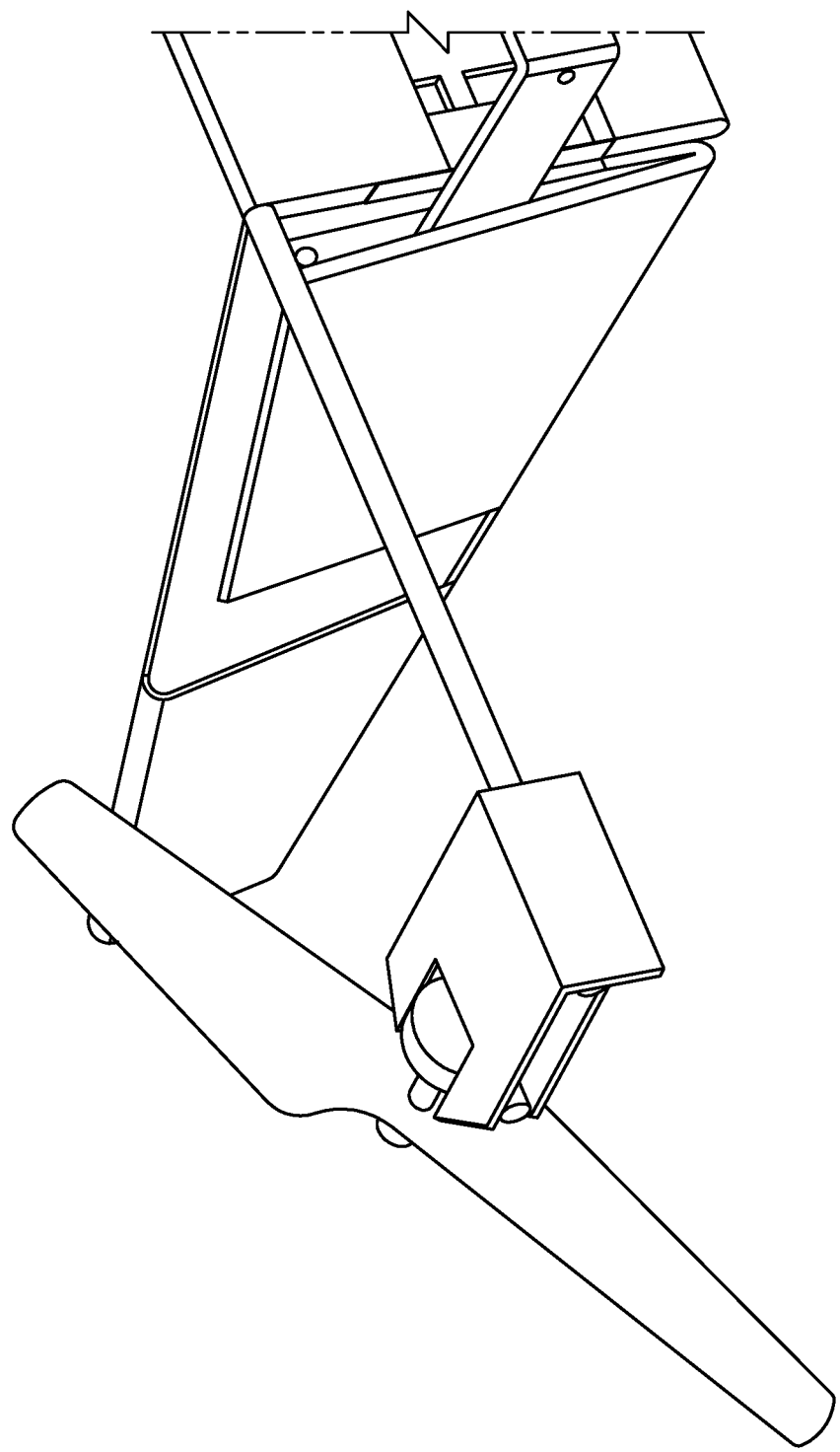
Figure 23H:
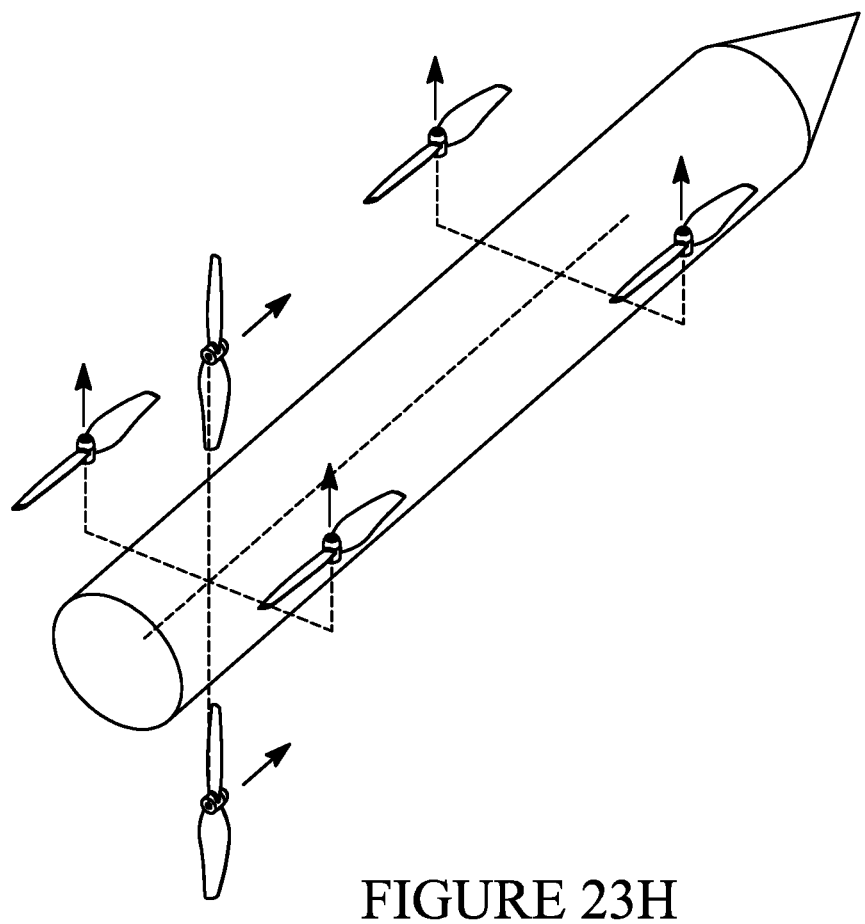
Figure 23I:
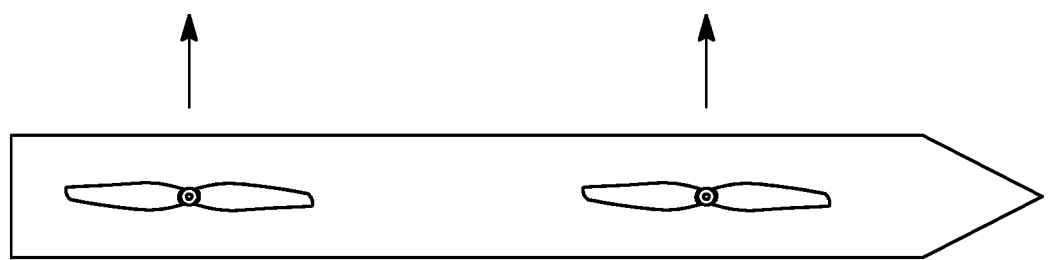
Figure 23J:
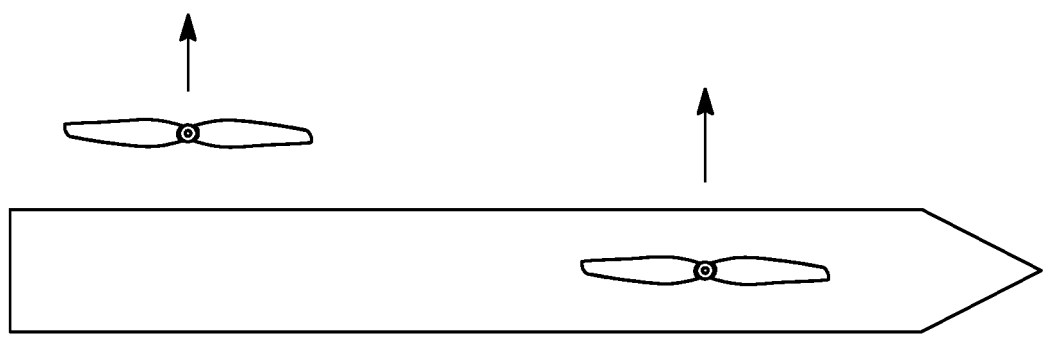

Note that the 2 wing rotors and the 2 fin rotors may either be inline with each other per FIG. 23I, or in separate planes per FIG. 23J. In the arrangement of FIG. 23J the rocket drone will typically be able to achieve greater forward velocity during horizontal flight, but at the expense of control. Conversely, the arrangement of FIG. 23I will provide better control as both sets of propellers are in line with the center of gravity, but less forward velocity during horizontal flight.

Of course, many alternative design variations and embodiments are possible. For example, as shown in FIGS. 23A to 23J, the second set of wings/rotors positioned towards the top of the fuselage (i.e. the forward wing design), can employ a rotor that is concealed within the wing and extendable flaps that add wing surface area and directional control. The folded section of the wing can also act as legs for landing.

In one embodiment of the design, it was found that additional surface area was required for the forward wings. Rather than lengthening the wings, the width of the wings was increased to about 3" by the use of the extendable flaps (i.e. the metal flaps shown in FIGS. 23A and 23B), which were arranged to pop out when the forward wings were deployed.

Figure 22:
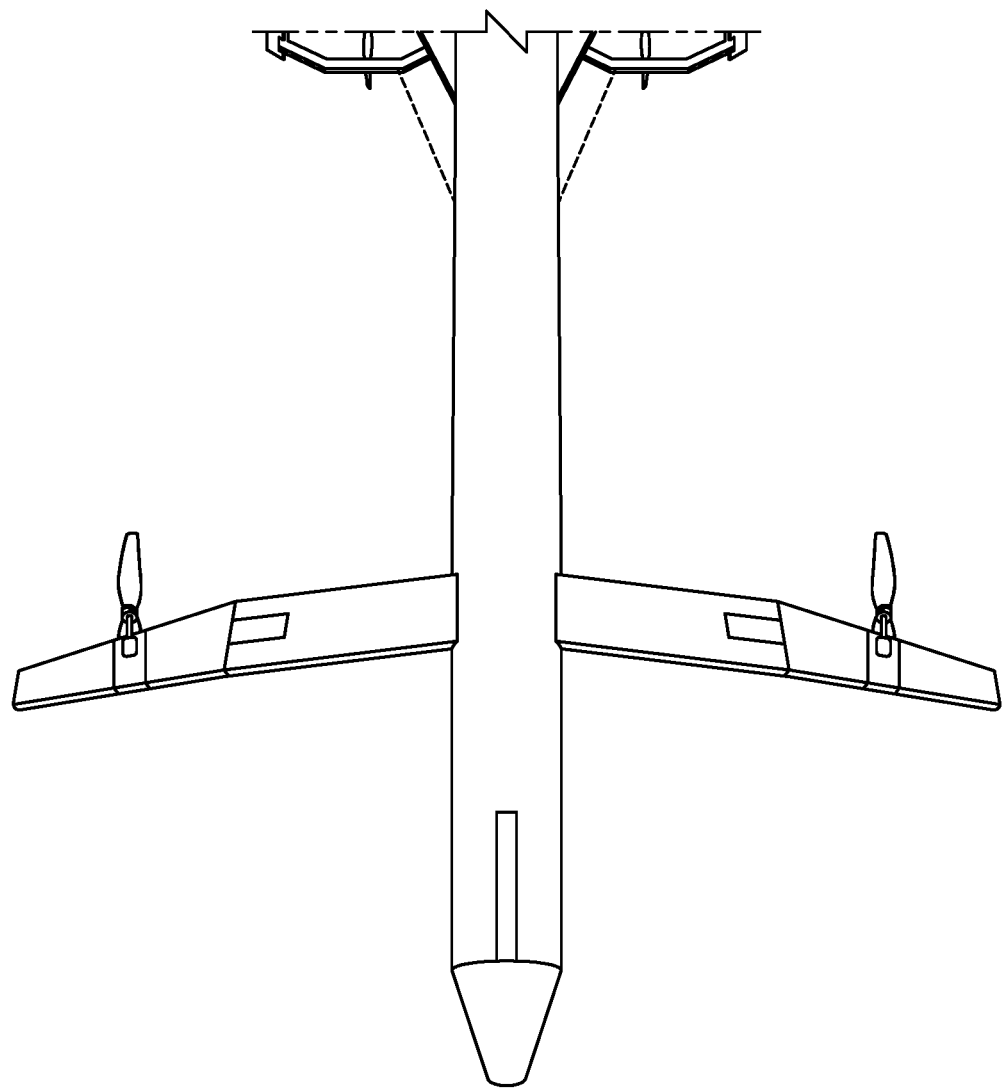

The folded section of the forward wings are shown in a 90 degree position in FIGS. 23A and 23C (i.e. the landing position), and in a flat or 0 degree position in FIGS. 22 and 23B. But the folded section of the forward wings, or even an additional smaller flap at the end, may also be used to aid in control when the forward wings themselves are in a stowed position (see FIG. 21). When the forward wings are stowed, small adjustments to the folded sections may be used to control the direction and stability of the rocket drone. Similar small control adjustments may also be made with the additional 'cupping' fins at the bottom end of the fuselage (see FIGS. 4 and 6C). These additional 'cupping' fins are generally at a 45 degree angle to the fuselage when deployed, but they may also be oriented so they are generally in line with the fuselage for control purposes, for example during horizontal flight.

Design Details

Figure 12A:
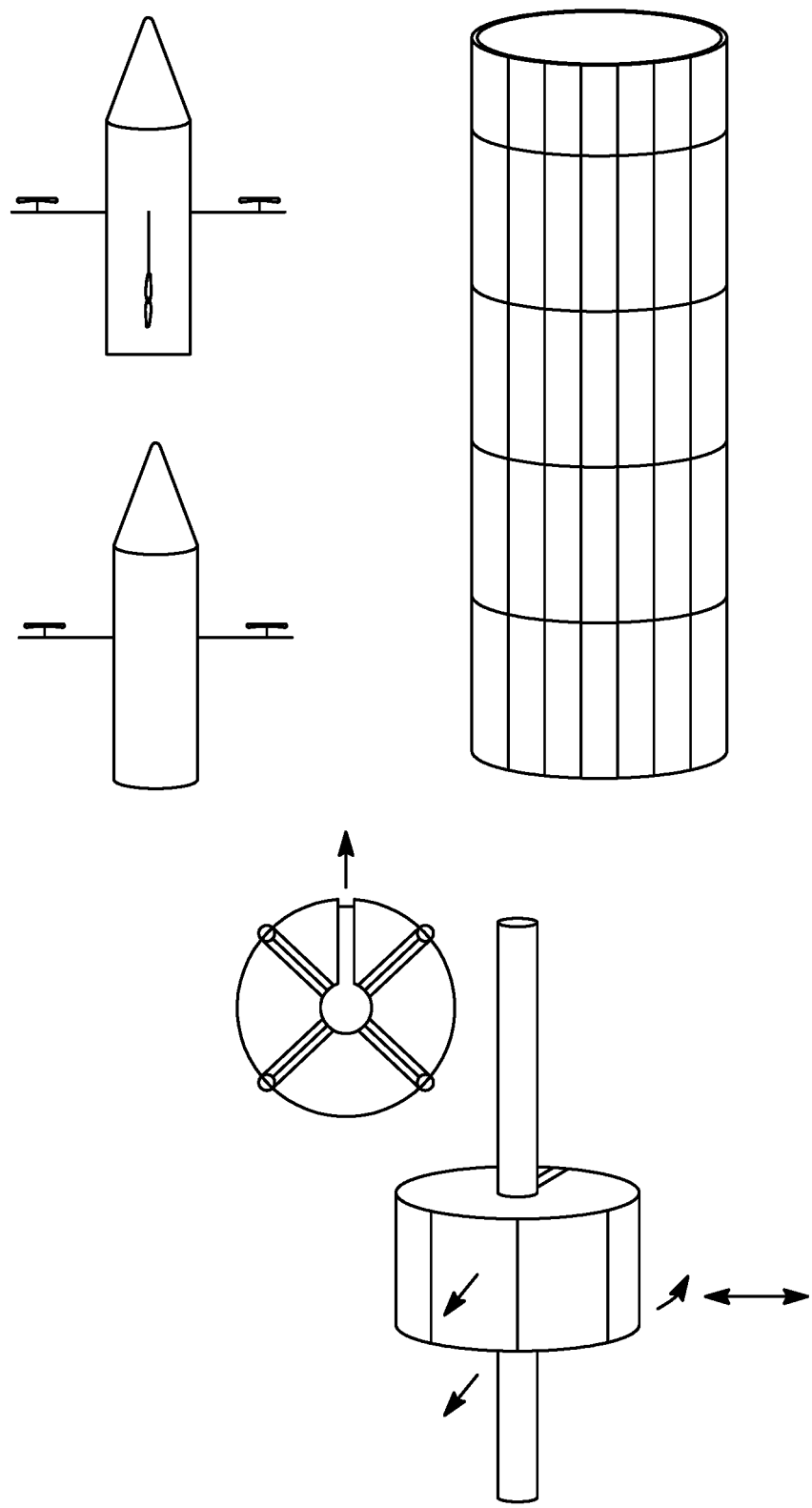
Figure 12B:
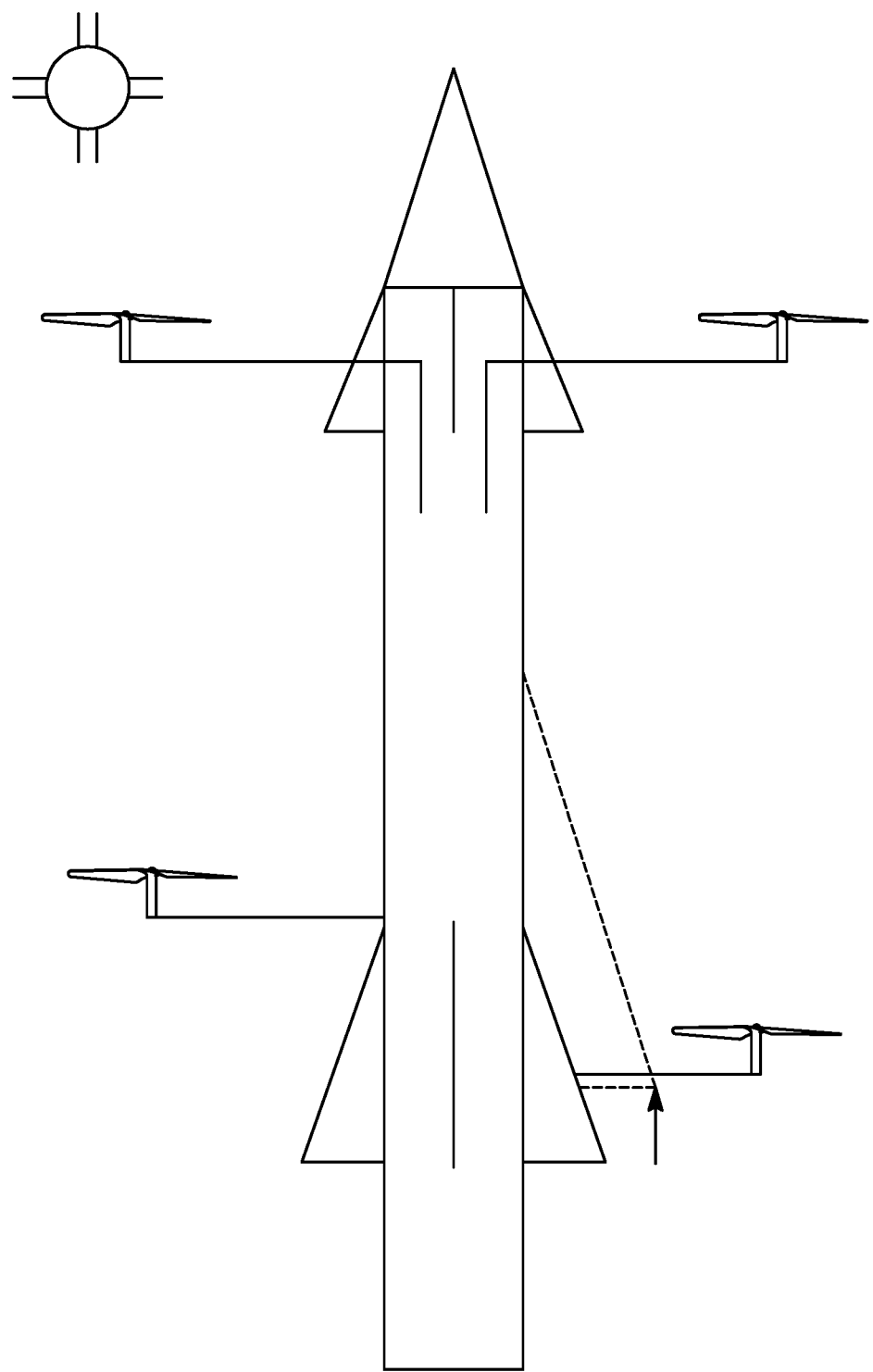
Figure 12C:
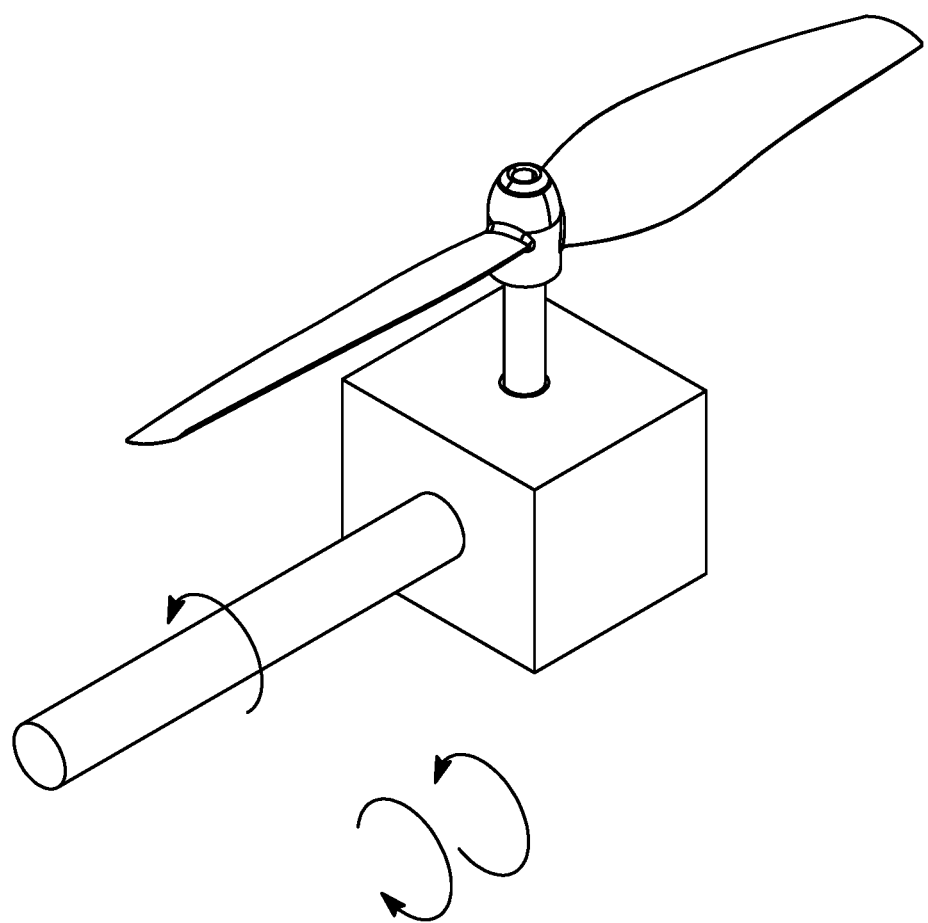

Manned and unmanned aircraft of the similar types generally have recognizably similar physical components. The main exceptions are the cockpit and environmental control system or life support systems. Small civilian drones have no life-critical systems, and thus may be built out of lighter but less sturdy materials and shapes, and may use less robustly tested electronic control systems. Commercial drones are generally durable enough to withstand the accelerations associated with the rocket engines used in the invention, as these accelerations are much smaller than the decelerations that drones are generally able to withstand when crashing. The payloads typically carried by drones (such as a camera) weigh considerably less than an adult human and the necessary life-support systems, so they may be considerably smaller. Payload information for the drone rocket is shown in FIG. 12A. Note in particular that the fuselage of the rocket drone in FIG. 12A may be extended along the vertical rod, multiple payloads being inserted as individual drums, as shown. Each drum has a slot which mates with the vertical rod, so it can be removed or installed. Such payload drums could even contain separate mini-drones which could be deployed separately from the main drone.

Figure 13:
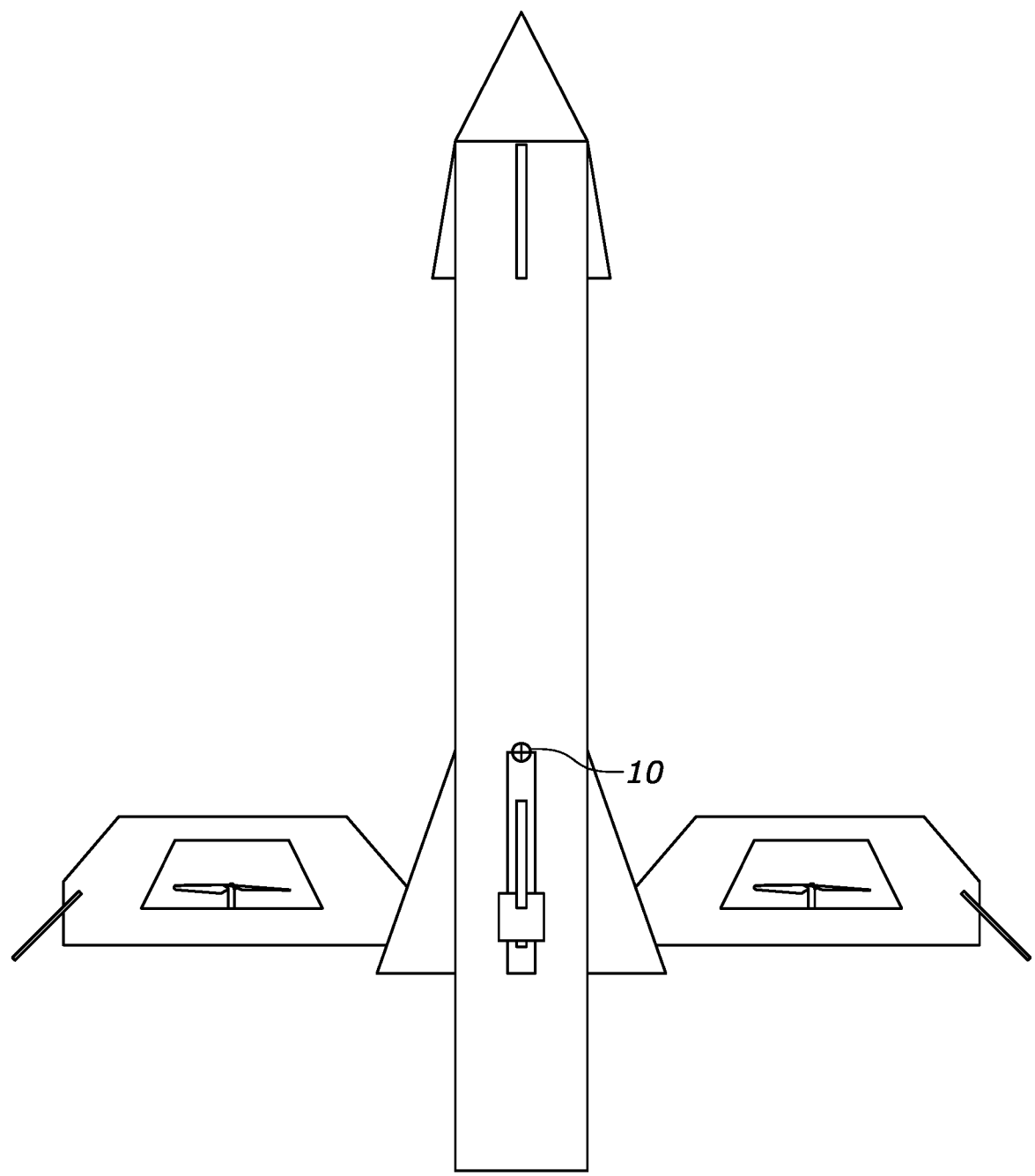
FIG. 13 presents the approximate center of gravity of the rocket propelled drone in the deployed configuration.

The center of gravity (COG) is an important factor is designing the rocket propelled drone. Traditional drones do not have the tall fuselage as depicted in the figures of the present invention. Drones have a COG around the same height as the propellers to allow for stability and to prevent the drone from tipping over. Although the present design has a tall fuselage body, the COG 10 is still close to the plane of the propellers in the deployed position as shown in FIG. 13 because of the light material used to fabricate the fuselage. The engine, motors, batteries, and other heavier components in the rocket propelled drone are positioned at the bottom portion of the fuselage, again to increase stability and to prevent the device from tipping or overturning in flight.

When the COG is lower than the center of thrust (COT), there is greater control at lower speeds, similar to a moving pendulum. If the COG is equal in elevation with the COT, the speed at which the drone can change the axis of flight is increased. The effect is more exaggerated the greater the difference in elevation of the COG and COT. The present invention changes its center of pressure (COP), COG, and COT as it transitions into the different flight positions.

Equations 1, 2, and 3 shown below, are some of the formulas that may be used for finding the COP. These formulas are found in the "Handbook of Model Rocketry" (Stine, G., H. Wiley; 7th edition (Apr. 22, 2004) **). These formulas may be used as a tool to help shape and design the rocket drone. By knowing the COP of any given design, the weight of the rocket can be balanced, even as the wings and propeller/rotor blades are deployed.

$$x_f := X_f + \frac{X_s(C_R + 2C_T)}{3(C_R + C_T)} + \frac{1}{6}\left(C_R + C_T - \frac{C_R C_T}{C_R + C_T}\right) \quad \text{Equation 1}$$

$$C_{Na\_T} := C_{Na\_n} + C_{Na\_fb} \quad \text{Equation 2}$$

$$X_{CP} := \frac{C_{Na\_n} x_n + C_{Na\_fb} x_f}{C_{Na\_T}} \quad \text{Equation 3}$$

$x_f$ is the location of the COP of the wings. Xf is the distance from the nose tip to the wing root chord leading edge. $X_s$ is the sweep length of the wings. $C_R$ is the wing root chord. $C_T$ is the wing tip chord. $C_{Na\_T}$ is the total normal force on the rocket. $C_{Na\_n}$ is the normal force on the nose cone. $C_{Na\_fb}$ is the normal force on the wings with the body of the rocket present. $X_{CP}$ is the location of the COP for the entire rocket. $x_n$ is the location of the COP of the nose cone.

Figure 2:
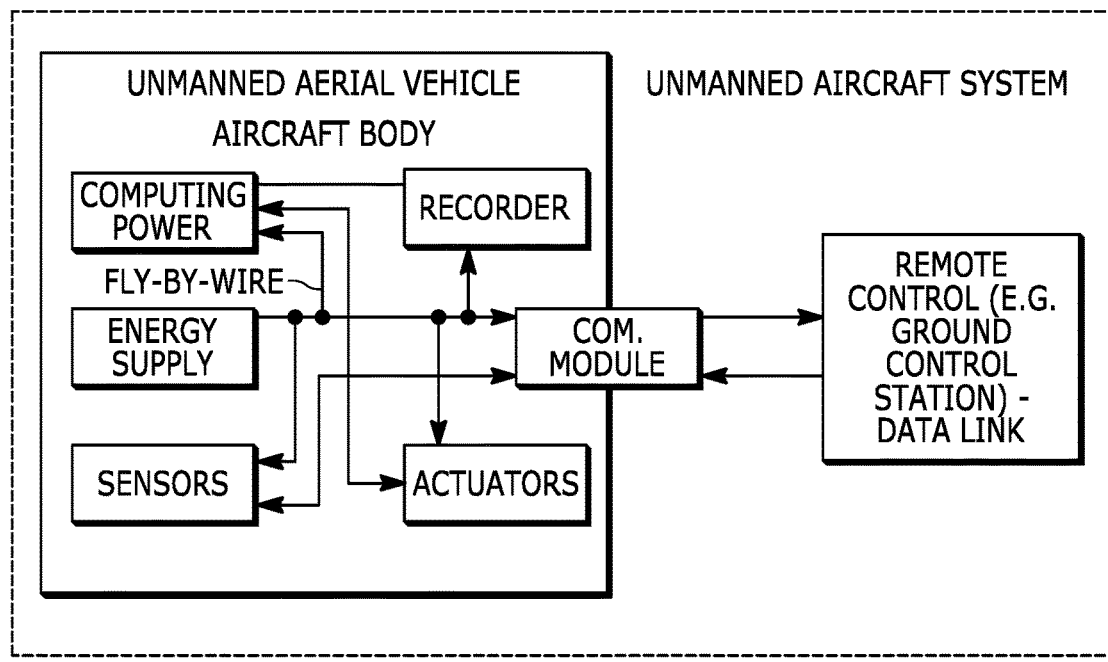
FIG. 2 presents a schematic diagram of a control system for a drone in an embodiment of the present invention.

The basic design components of drones are well known in the art. Some of the design components are described below. In general, the electronic systems of the invention include the components shown in FIG. 2. On the drone, this includes a CPU (central processing unit) such as a microprocessor or microcontroller and associated memory, a power supply such as lithium ion batteries and possibly solar cells, various sensors such as a GPS unit and possible a video camera, actuators such as those to release and deploy the propellers/rotors and/or wings, and a communication module to communicate with the ground control unit. The ground control unit includes switches, joysticks and other input controls, a wireless transmitter to communicate instructions to the drone, and possibly a display of the camera on the drone. Many of these components are commonly available on existing drone systems, so it is not difficult to add the extra control components to effect the invention, such as:

- components to deploy and/or stow propellers and/or wings;
- components to change the attitude of the fuselage from vertical to horizontal;
- components to fire additional rockets and/or the ejection charge; and
- components to assist in landing the drone in a desired location.

Control system: Control systems for drones are often different from manned aircraft control systems. For remote human control (ie. ground control), a camera and video link almost always replace the cockpit windows and radio-transmitted digital commands replace physical cockpit controls. Autopilot software is often used on both manned and unmanned aircraft, with varying feature sets. For a drone to function properly there are control systems in place for the multiple rotors. Control loop principles are typical flight-control loops for a multirotor. Drones employ open-loop, closed-loop or hybrid control architectures. Open loop control architecture provides a positive control signal (faster/slower, left/right, up/down) without incorporating feedback from sensor data. Closed loop control incorporates sensor feedback to adjust behavior (reduce speed to reflect tailwind, move to altitude 300 feet). A PID (proportional, integral, differential) controller is commonly used for closed loop control. Sometimes, feedforward systems are employed rather than feedback systems.

Flight control: Flight control is one of the lower-layer systems and is similar to manned aviation. Plane flight dynamics, control and automation, helicopter flight dynamics and controls, and multirotor flight dynamics were researched long before the rise in popularity of drones.

Ground control: This includes a human operating a radio transmitter/receiver, a smartphone, a tablet, a computer, or the original meaning of a military ground control station (GCS). Control from wearable devices, human movement recognition and, human brain waves was also recently demonstrated.

Body: The primary difference for unmanned aircraft is the absence of the cockpit area and the windows. Tailless quadcopters are a common form factor for rotary wing drones while tailed mono- and bi-copters are common for manned platforms. In the present invention, the height of the fuselage is incorporated into the drone design. This is important for weight and stability control.

Power supply: Small drones use mostly lithium-polymer batteries (Li-Po). The type of battery used for a drone depends on the size and weight of the drone, and the motors being used in the drone. The power supply can be complemented with solar cells, increasing the amount of time that the drone can stay aloft. Solar cells can be positioned on the wings or other flat surfaces of the drone, or flexible solar cells can be wrapped around the fuselage itself.

Computing: UAV computing capability followed the advances of computing technology, beginning with analog controls and evolving into microcontrollers, then system-on-a-chip (SOC) and single-board computers (SBC). System hardware for small drones is often called the Flight Controller (FC), Flight Controller Board (FCB) or Autopilot.

Sensors: Position and movement sensors give information about the aircraft state. Exteroceptive sensors deal with external information like distance measurements, while exproprioceptive ones correlate internal and external states. Non-cooperative sensors are able to detect targets autonomously so they are used for separation assurance and collision avoidance.

Degrees of freedom (DOF): When referencing DOF in drones, the number of DOF refers to both the amount and quality of sensors on-board. For example, 6 DOF implies 3-axis gyroscopes and accelerometers (also known as an inertial measurement unit (IMU)), 9 DOF refers to an IMU plus a compass, 10 DOF further adds a barometer, and 11 DOF usually adds a GPS receiver. The gyroscopes and accelerometers provide good stability for the drone, however the stability for the drone is also affected by the quality of the propellers, motors, bearings, shafts, etc.

Actuators: UAV actuators include digital electronic speed controllers (which control the RPM of the motors) linked to motors/engines and propellers, servomotors (for planes and helicopters mostly), weapons, payload actuators, LEDs and speakers. The actuators in the present invention may be linked to the rocket engines, the motors for the propellers, the pivoting mechanism of the rotor assemblies, etc.

Propellers: Propellers for drones may be made of plastic or carbon fiber materials. The propellers for drones should be light in weight, have good balancing designs, and should be able to provide the proper thrust and RPM for the desired speed of the drone. The propellers may be selected based the size and weight of the drone and can be selected based on length or pitch, and number of blades. Normally, in a quadcopter type implementation 2 of the 4 propellers will be designed to rotate in a clockwise direction, and the remaining 2 propellers will be designed to rotate in a counter clockwise direction. The 2 propellers rotating in the same direction may be placed opposite each other for stability and control.

Motors: The motors for drones control the propeller motion. In the present invention, a motor for the pivoting mechanism may also be required. The motors should be selected based on the weight and size of the drone and additional components. Ideally, for multirotor systems the motors should produce 50% more thrust than the total weight of the drone with the additional components. The additional components may include a camera, batteries, etc.

Software: UAV software is usually called the flight stack or autopilot. Drones are real-time systems that require rapid response to changing sensor data. Examples of how to implement software for drones include using Raspberry Pis, Beagleboards, Arduinos, etc. These single board computers may be shielded with NavIO, PXFMini, etc. or may be designed from scratch, for example, Nuttx, preemptive-RT Linux, Xenomai, Orocos-Robot Operating System or DDS-ROS 2.0. Some examples of civil-use open-source stacks used for UAVs include KKMultiCopter, ArduCopter, DroneCode, MultiWii, BaseFlight, CleanFlight, BetaFlight, RaceFlight, iNav, Paparazzi, OpenPilot, TauLabs, dRonin, LibrePilot, CrazyFlie, etc.

Communication: Most drones use a radio frequency front-end that connects the antenna of the radio to an analog-to-digital converter and a flight computer that controls avionics (and that may be capable of autonomous or semi-autonomous operation). The radio allows remote control and exchange of video and other data. Downlink may convey payload management status, video payload or telemetry data. The radio signal from the operator side may be issued from ground control as described above.

Solid Fuel Rocket Engines

Figure 1:
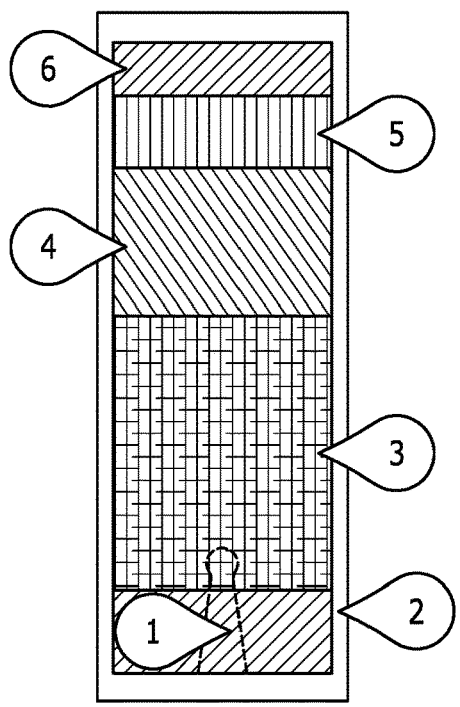
FIG. 1 presents a schematic diagram of a solid fuel rocket engine as known in the art.

FIG. 1 presents a schematic diagram of a solid fuel rocket engine and the anatomy of a basic model rocket motor. A typical solid fuel rocket engine is about 8 cm (3.1 in) long.

The engine may comprise a nozzle 1, a case 2, a propellant 3, a delay charge 4, an ejection charge 5 and an end cap 6.

Most small model rocket motors use single-use engines, with cardboard bodies and lightweight molded clay nozzles, ranging in impulse class from fractional A to G. Model rockets generally use commercially manufactured black-powder motors. These motors are tested and certified by the National Association of Rocketry, the Tripoli Rocketry Association (TRA) or the Canadian Association of Rocketry (CAR). Black-powder motors come in impulse class ranges from ⅛A to E, although a few class F black-powder motors have been made.

The physically largest black-powder model rocket motors are typically E-class, as black powder is very brittle. Because of possible failures with large black-powder model rocket motors, rocket motors with power ratings higher than D to E customarily use composite propellants made of ammonium perchlorate, aluminum powder, and a rubbery binder substance contained in a hard plastic case. This type of propellant is similar to that used in the solid rocket boosters of the space shuttle and is not as brittle as black powder, this increases motor reliability and resistance to fractures in the propellant. These motors range in impulse class from D to O. Composite motors produce more impulse per unit weight (specific impulse) than black-powder motors.

and maintenance, repair, and operations contractors. The device may be used for the visual inspection of aircraft maintenance.

The device may be used in military applications. Currently drones are used by a broad range of military forces for many applications including reconnaissance, attack, defense against other drones, and as targets for military training. As of January 2014, the U.S. military operated 7362 RQ-11B Ravens, 145 AeroVironment RQ-12A Wasps, 1137 AeroVironment RQ-20A Pumas, 306 RQ-16 T-Hawk small unmanned aerial systems, and 491 RQ-7 Shadows.

The rocket propelled drone may be used to help in the removal of land mines. British and Dutch scientists have been developing drones with advanced imaging technology and various sensors (metal detectors, hyperspectral imaging technology, etc.) to more affordably and effectively map and efficiently clear minefields. These systems will enable safer, cheaper and more efficient clearance of landmines.

The device may be used in civil applications, including aerial crop surveys, aerial photography, search and rescue, commercial aerial cartographic purposes and 3D mapping for inspection of power lines and pipelines, counting wildlife, delivering medical supplies to otherwise inaccessible regions, detection of illegal hunting, reconnaissance operations, cooperative environment monitoring, border patrol missions, convoy protection, forest fire detection and moni-

| | | | | | | | | | Initial | | Propellant | |
|---|---|---|---|---|---|---|---|---|---|---|---|---|
| | | | Total | Total | Time | Max. Lift | Max. | | | Weight | | Weight |
| Prod. | Engine | Prices | Impulse | Impulse | Delay | Wt. | Thrust | Thrust | | | | |
| No. | Type | 3 for | lb. · sec. | N · sec. | (±15%) | oz/g | lb./N | Duration | oz. | g | oz. | g |
| 1593 | 1/2A6-2* | | 0.28 | 1.25 | 2 sec. | 2.5/70.8 | 2.88/12.8 | 0.20 sec. | 0.53 | 15.0 | 0.055 | 1.56 |
| 1598 | A8-3 | | 0.56 | 2.50 | 3 sec. | 4.0/113.2 | 3.00/13.3 | 0.32 sec. | 0.57 | 16.2 | 0.110 | 3.12 |
| 1601 | B4-2 | | 1.12 | 5.00 | 2 sec. | 4.0/113.2 | 3.00/13.3 | 1.20 sec. | 0.70 | 19.8 | 0.294 | 8.33 |
| 1602 | B4-4 | | 1.12 | 5.00 | 4 sec. | 3.5/99.1 | 3.00/13.3 | 1.20 sec. | 0.74 | 21.0 | 0.294 | 8.33 |
| 1605 | B6-2 | | 1.12 | 5.00 | 2 sec. | 4.5/127.4 | 3.00/13.3 | 0.83 sec. | 0.68 | 19.3 | 0.220 | 6.24 |
| 1606 | B6-4 | | 1.12 | 5.00 | 4 sec. | 4.0/113.2 | 3.00/13.3 | 0.83 sec. | 0.71 | 20.1 | 0.220 | 6.24 |
| 1620 | B8-5* | | 1.12 | 5.00 | 5 sec. | 5.0/141.5 | 5.00/22.2 | 0.60 sec. | 0.68 | 19.3 | 0.220 | 6.24 |
| 1617 | C5-3* | | 2.25 | 10.00 | 3 sec. | 8.0/226.4 | 5.00/22.2 | 2.10 sec. | 0.90 | 25.5 | 0.450 | 12.70 |
| 1613 | C6-3 | | 2.25 | 10.00 | 3 sec. | 4.0/113.2 | 3.00/13.3 | 1.70 sec. | 0.88 | 24.9 | 0.440 | 12.48 |
| 1614 | C6-5 | | 2.25 | 10.00 | 5 sec. | 4.0/113.2 | 3.00/13.3 | 1.70 sec. | 0.91 | 25.8 | 0.440 | 12.48 |

REGULAR ENGINES - SINGLE STAGE (Green Label)

Advantages

The present invention has many advantages over traditional drones. The rocket propelled drone can reach a desired altitude quickly. The rocket engines that may be used for the present invention are available in various sizes, with specified thrust. Thus, a given engine will launch the rocket to a predictable altitude, depending on the weight of the rocket/drone and payload.

The rocket propelled drone can maintain the desired altitude, and the drone may be moved or positioned as desired. The rocket propelled drone also has the ability to land in a predictable manner, in a desired location. In contrast, other rockets and drones typically have only a parachute for landing, so their landing site is completely uncontrolled and is determined solely by the wind. As a results, parachute-only systems are often lost, caught in trees or land in inaccessible areas.

Applications

There are many applications that the present invention can be used for. Some applications are described below, however there are many other applications.

The device may be used in aerospace applications. For example, the rocket propelled drone may be used for airlines toring, surveillance, coordinating humanitarian aid, plume tracking, land surveying, fire and large-accident investigation, landslide measurement, illegal landfill detection, construction industries, smuggling, and crowd monitoring. U.S. government agencies currently use drones for patrolling borders, scouting property, locating fugitives, SWAT teams, and emergency management offices. Other types of drone uses for civil applications include surveillance, recreation, news-gathering, and personal land assessment.

The rocket propelled drone may be used as a hobby and for recreational use. Model aircraft (small UAVs) have been flown by hobbyists since the earliest days of manned flight. Recreational uses of drones include filming and photographing recreational activity, and drone racing. The filming and photography may be done by incorporating a payload in the form of a camera on the drone.

The camera being incorporated as a payload on the drone may also allow for commercial aerial surveillance. Aerial surveillance of large areas is possible with low-cost UAVs. Some surveillance applications that may incorporate drone use include livestock monitoring, wildfire mapping, pipeline security, home security, road patrol and antipiracy.

Professional aerial surveying: Currently UAV technology is used worldwide for aerial photogrammetry and LiDAR platforms. This would be professional aerial surveillance.

Another application for the camera in or on the drone may include commercial and motion picture filmmaking Drones may be used for pictures or videos that would otherwise require a helicopter or a manned aircraft. The use of a rocket propelled drone would save money and reduce the risk for pilots and their crews. Currently drones are used by the media at sporting events for example, the 2014 Winter Olympics, as they allow for greater freedom of movement than cable-mounted cameras. This commercial filming may also include journalism type applications. Journalists are currently using drones for newsgathering as they can cover large, inaccessible areas quickly. Drones have covered disasters such as typhoons.

The rocket propelled drone may also be used in law enforcement applications. Currently, approximately 167 police and fire departments bought UAVs in the United States in 2016 to assist in aerial surveillance and general law enforcement duties. In August 2013, the Italian defense company Selex ES provided an unarmed surveillance UAV to the Democratic Republic of Congo to monitor movements of armed groups in the region and to protect the civilian population more effectively.

The device may be used search and rescue missions. Drones have been used in search and rescue missions after hurricanes struck Louisiana and Texas in 2008. Drones called Predators, operating between 18,000 and 29,000 feet, performed search and rescue missions and damage assessment using optical sensors and a synthetic aperture radar. The synthetic aperture radar can penetrate clouds, rain or fog, in daytime or nighttime conditions, all in real time. Drones have also been used as airborne lifeguards, locating distressed swimmers using thermal cameras and dropping life preservers to the distressed swimmers. Drones can provide intelligence information about an affected area for helping is disaster relief missions.

Scientific research may further benefit from the use of the rocket propelled drone. Drones are especially useful in accessing areas that are too dangerous for manned aircraft. For example, the U.S. National Oceanic and Atmospheric Administration began using the Aerosonde unmanned aircraft system in 2006 as a hurricane hunter. The 35-pound system can fly into a hurricane and communicate near-real-time data directly to the National Hurricane Center.

The surveillance and film type drone applications may also be used for anti-poaching missions. Drones may be used to aid conservation efforts both at sea (poaching of whales and seals) and on land (monitoring rhinos, tigers and elephant and other endangered species). In both cases, very large areas of difficult terrain must be observed and/or monitored.

Pollution monitoring and conservation may also further benefit from the use of the rocket propelled drone. Drones equipped with air quality monitors provide real time air analysis at various elevations. Large areas of land, and their environmental properties can easily be assessed or monitored using drones.

The device may also be used for geosurveying for example, oil, gas and mineral exploration and production, inspection of power lines, geophysical surveys, and geomagnetic surveys where measurements of the Earth's varying magnetic field strength are used to calculate the nature of the underlying magnetic rock structure. A knowledge of the underlying rock structure helps to predict the location of mineral deposits. Oil and gas production includes the monitoring of the integrity of oil and gas pipelines and related installations. For above-ground pipelines, this monitoring activity can be performed using digital cameras mounted on drones. Drones may act as a system to survey and monitor pipelines, dams and other rural infrastructures.

The rocket propelled drone may be used for archaeology applications. Drones may speed up survey work and protect sites from squatters, builders and miners. They may help researchers produce 3-D models of sites instead of 2-D maps in days or weeks instead of months or years. They may also be used to discover evidence of looted archaeological sites, or to search for sites in rainforest or other environments.

The device may be used for cargo transport. Currently there is a delivery drone (the RQ-7 Shadow) that can deliver a "Quick-MEDS" canister to front-line troops. Drones can transport medicines and medical specimens in and out of inaccessible regions. Initial attempts have been made for commercial use of drones for food delivery, Amazon deliveries, pharmaceuticals and supplies, electronics, prescriptions and personal care products. The rocket propelled drone would allow for fast deliveries at greater heights.

Agriculture: monitoring livestock, crops and water levels, performing crop spraying, creating 3-D images of landscapes to manage farm design, as drones are generally cheaper than full-sized helicopters.

In construction, rocket propelled drones may be used to survey building sites to help monitor and report progress, spot errors early on to avoid rework, and show off finished projects in marketing materials. Drones may be used for commercial purposes such as construction progress monitoring and site surveying. They may also be used in construction to measure raw materials as inputs to building construction. Construction sites are generally very hazardous environments and thus workers are already protected by hardhats and other safety precautions. Therefore the introduction of rocket propelled drones would be smoother in the safer environment.

Currently drones are used for light shows or displays. Drones equipped with LED's may be used to give a nighttime aerial display, for example Intel's "Shooting star" UAV system used by Disney and the Super Bowl 2017 halftime show.

Submersible/Amphibious Design:

Submersible variants of the rocket drone have a number of useful and interesting advantages and applications. In addition to the obvious use of underwater surveillance and deploying ordnance underwater, they can be used, for example:

submersibility provides for a very useful evasive maneuvers for an airborne drone. That is, an airborne drone that is being pursued, could dive underwater to avoid detection or an attack;

it allows an airborne rocket drone to be deployed underwater, from a submarine; and submersible variants of the rocket drone could be used as sacrificial targets to protect submarines or ships from torpedoes.

The submersible/amphibious embodiment uses substantially the same guidance and control system as other embodiments described herein, except that for propulsion and directional control, accommodations are made for the hydrodynamics of water as opposed to the aerodynamics of flight. In this respect, many technical aspects of the submersible variant could be modeled after teachings used for torpedoes or submarines. For example, propulsion can be effected using existing torpedo propulsion systems such as an electrical propulsion system (i.e. lithium batteries, an electric motor and a pair of concentric, counter-rotating propellers), compressed air, rocket engines, SCEPS (stored chemical energy power systems), an OTTO system, pump-jets, etc. Because rocket engines provide their own source of oxygen for combustion they can operate quite effectively underwater. SCEPS use a chemical reaction (such as lithium and sulfur hexafluoride) to create steam to propel a turbine.

In the case of submarines, depth is controlled primarily by way of ballast control. In the case of torpedoes, depth is typically controlled by hydrodynamics, that is, by actuation of vanes and fins while the torpedo is being propelled. But either approach is easily accommodated. For example, ballast containers can easily be flooded by opening electrically actuated valves. Ballast containers can be evacuated using pressurized gas, for example using commercially available $CO_2$ cartridges in the case of smaller applications, or a pump and pressure vessel in the case of a larger application. The actual depth monitoring and control itself, can be effected using existing approaches, such as the use of pressure sensors and a closed loop or PID (proportional/integral/differential) control.

Making the fuselage and electronic components of the device water-proof is not a complicated issue, as even the non-submersible/amphibious embodiments are largely water-proof themselves. The fuselage in a non-submersible/amphibious embodiment is largely water-proof as for aerodynamic reasons, it is undesirable to have gaps or cracks in the fuselage. It is also desirable to have water-proof motors, actuators and other electronic components in non-submersible/amphibious embodiment so that the unit is weather-proof and durable, being able to withstand accidental crashes into lakes or other bodies of water.

Because of the higher density of water, directional control does not need the large surface area of wings and fins that are required for airborne control. Thus, underwater control can be affected using smaller fins, vanes and a rudder. However, there is no difficulty in using the larger wings, fins and rudder intended for airborne applications; the control system simply actuates them less dramatically than it would during air flight.

Torpedoes often use gyroscopic, inertial and/or servo control systems as once the torpedo has been launched, there is no control of the torpedo's direction. But in the case of the submersible variant of the rocket drone, continuous control is generally available wirelessly. So it is not necessary to use the gyroscopic, inertial and/or servo control systems that torpedoes have used in the past.

And of course, torpedoes are generally used in applications where they are required to 'home in' on a target. As a result, they have control systems designed for accomplishing this task, such as heat detection, sound detection, sonar, etc. Most of the conceived applications for the submersible variants of the rocket drone do not require such 'homing in', so it is not necessary to include such targeting control systems.

Figure 24A:
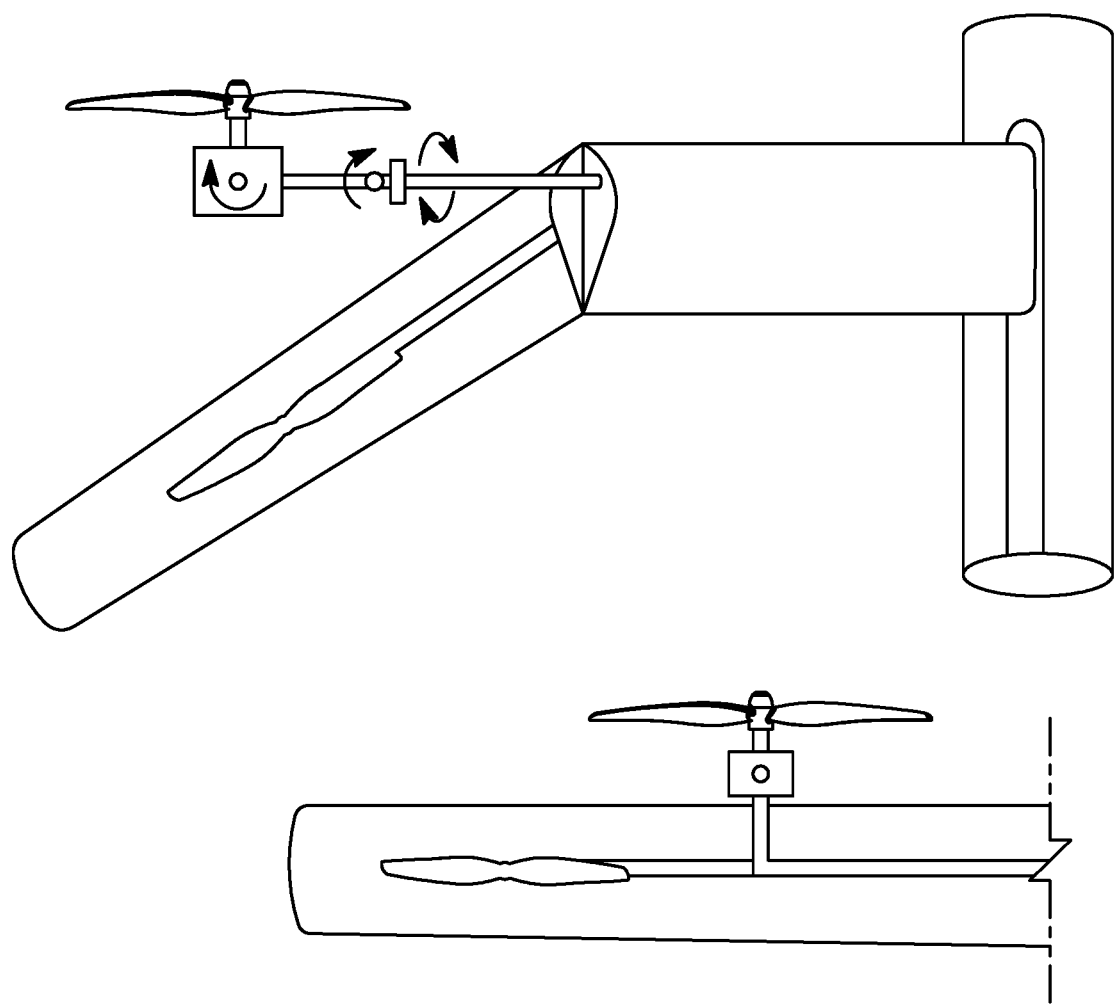
FIGS. 24A to 24C present schematic diagrams of a submersible/amphibious embodiment of the invention.
Figure 24B:
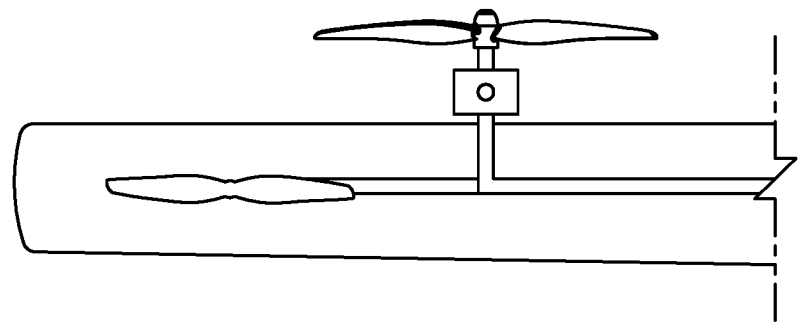
Figure 24C:
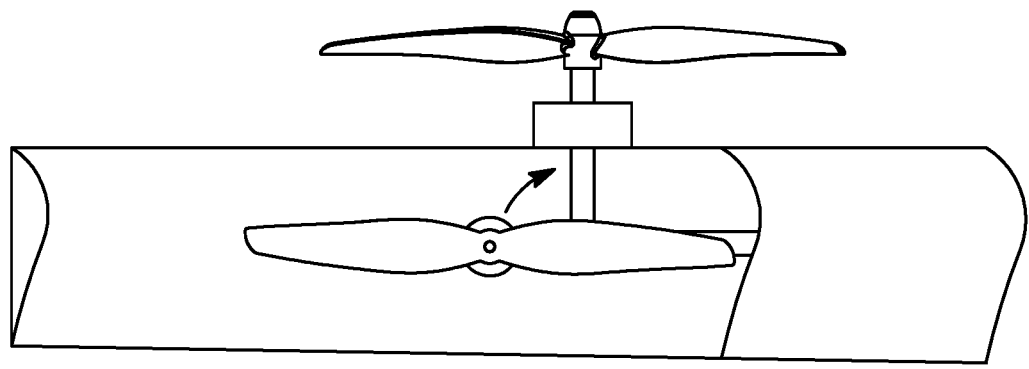
Figure 25A:
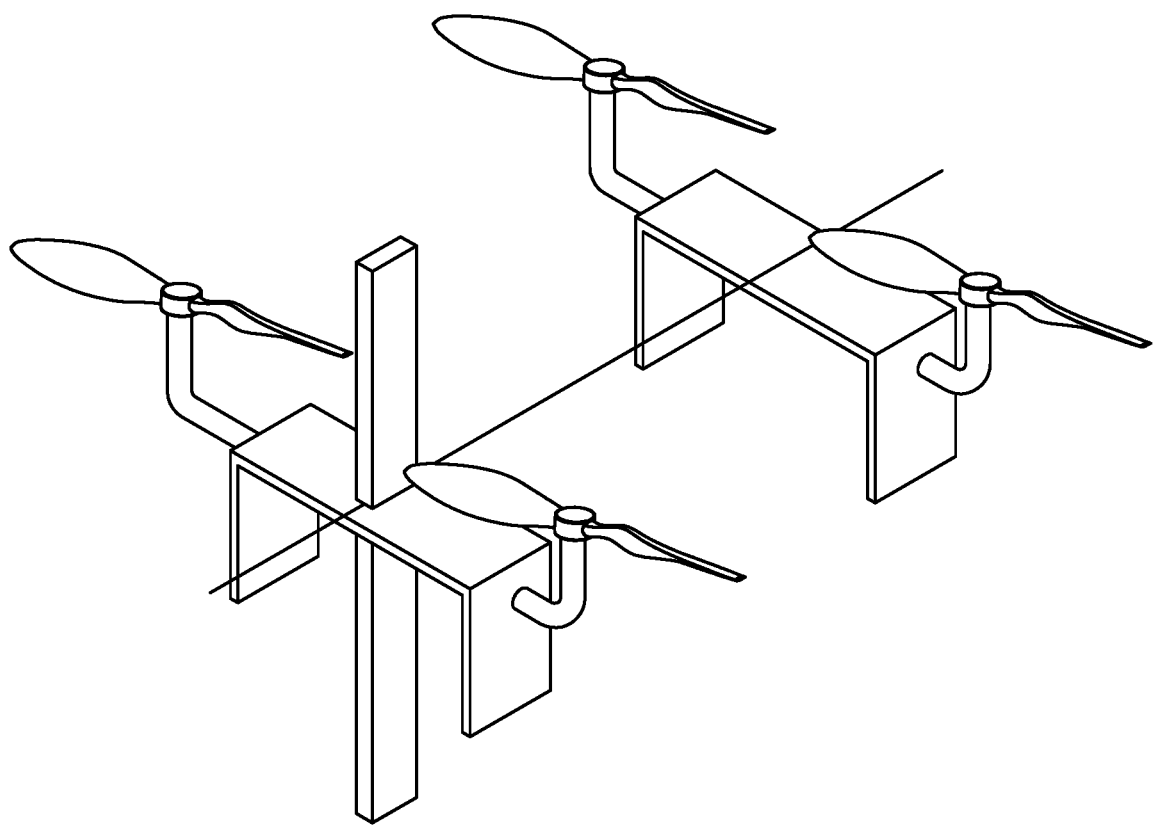
FIGS. 25A to 25D present schematic diagrams of additional details of the submersible/amphibious embodiment of the invention.
Figure 25B:
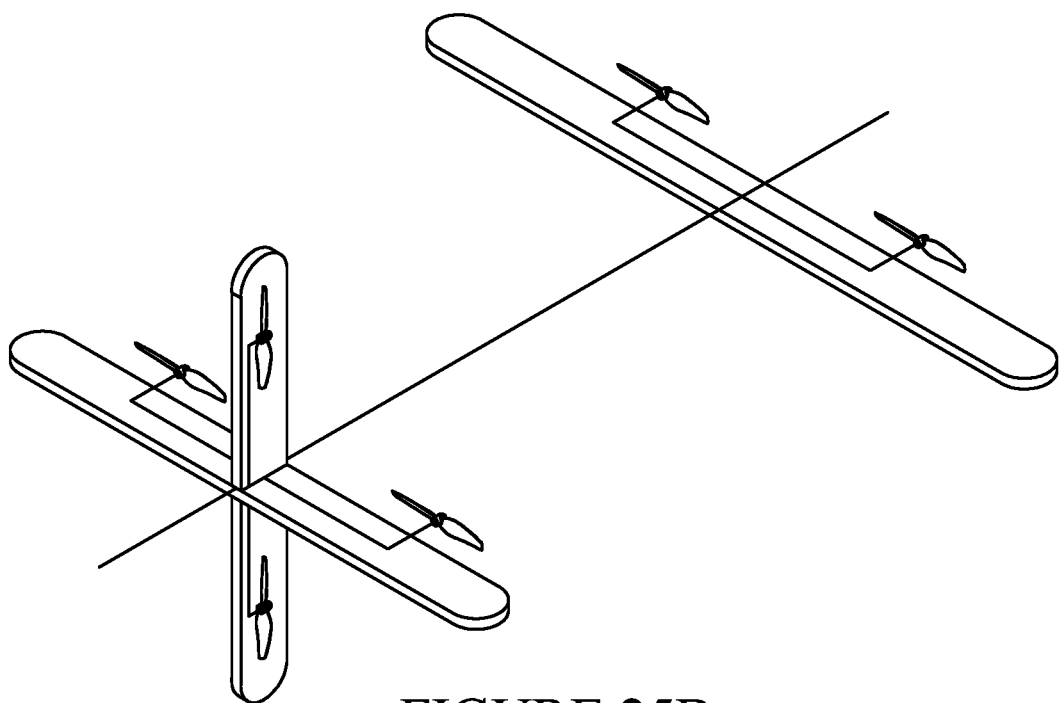
Figure 25C:
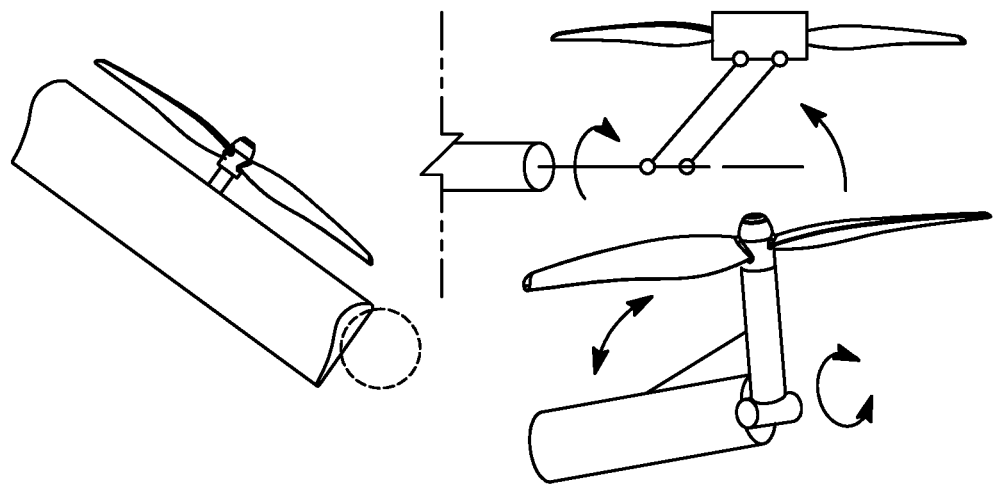
Figure 25D:
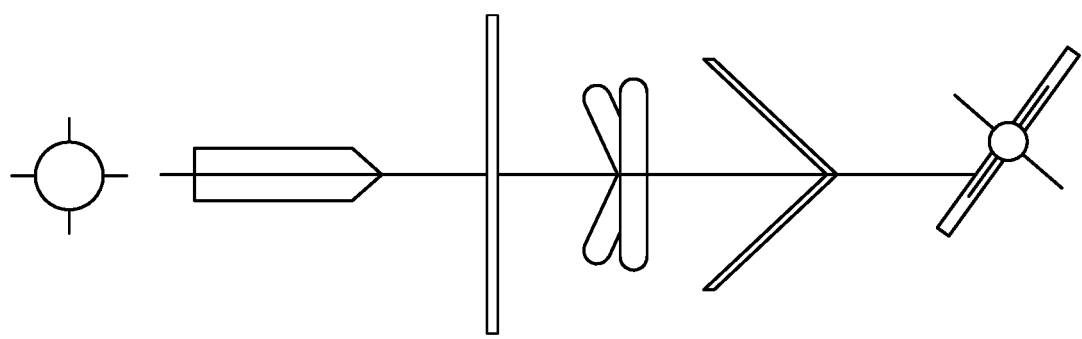

An exemplary diagram of the submersible/amphibious embodiment is presented in FIGS. 24A to 24C. The articulated rotor arm provides movement for the drone/helicopter position to be repositioned to a forward facing propeller. The wings can then be aligned to be straight, and provide maximum lift while travelling through the air. The underwater rotors are waterproof. Other electronic components can enable automonomous underwater robotics. Tail fin rotors provide added thrust in air and water.

The tail fins also comprise inflatable foot pods used for orientation and buoyancy, to position the device in the water or raise the rotors out of the water. Inflatable foot pads may be positioned in the ends of each of the fuselage rear fins as well as the inflatable feet in the wings.

By inflating and deflating the foot pads, the fuselage can change its orientation underwater, providing all-axis control or underwater operations. The inflatable feet are of sufficient distance from each other so as to be able to raise the fuselage from the surface of the water and provide a stable buoyant platform. The rotor assemblies articulate so as to maximize the ability to orientate the fuselage on all axis horizontally or vertically in water or air.

Additional details for the submersible/amphibious embodiment are shown in FIGS. 25A to 25D.

In particular, the wing and fin tips contain inflatable feet for raising the fuselage out of the water, enabling a surface launch and provide stability and buoyancy control on and in the water. By inflating or deflating the feet, the fuselage can change its orientation underwater, eg. pointing downwards by inflating the feet in the fins or originating horizontally by inflating feet in the wings and fins.

The rotors articulate 90° to raise upward from concealment within the wings. The wings articulate downward to expose the rotors allowing greater efficiency in drone/helicopter mode. The rotors can also pitch forward, combined with the straightened wings and fins for lift and flight control, effectively becoming an airplane (i.e. horizontal flight).

Figure 26A:
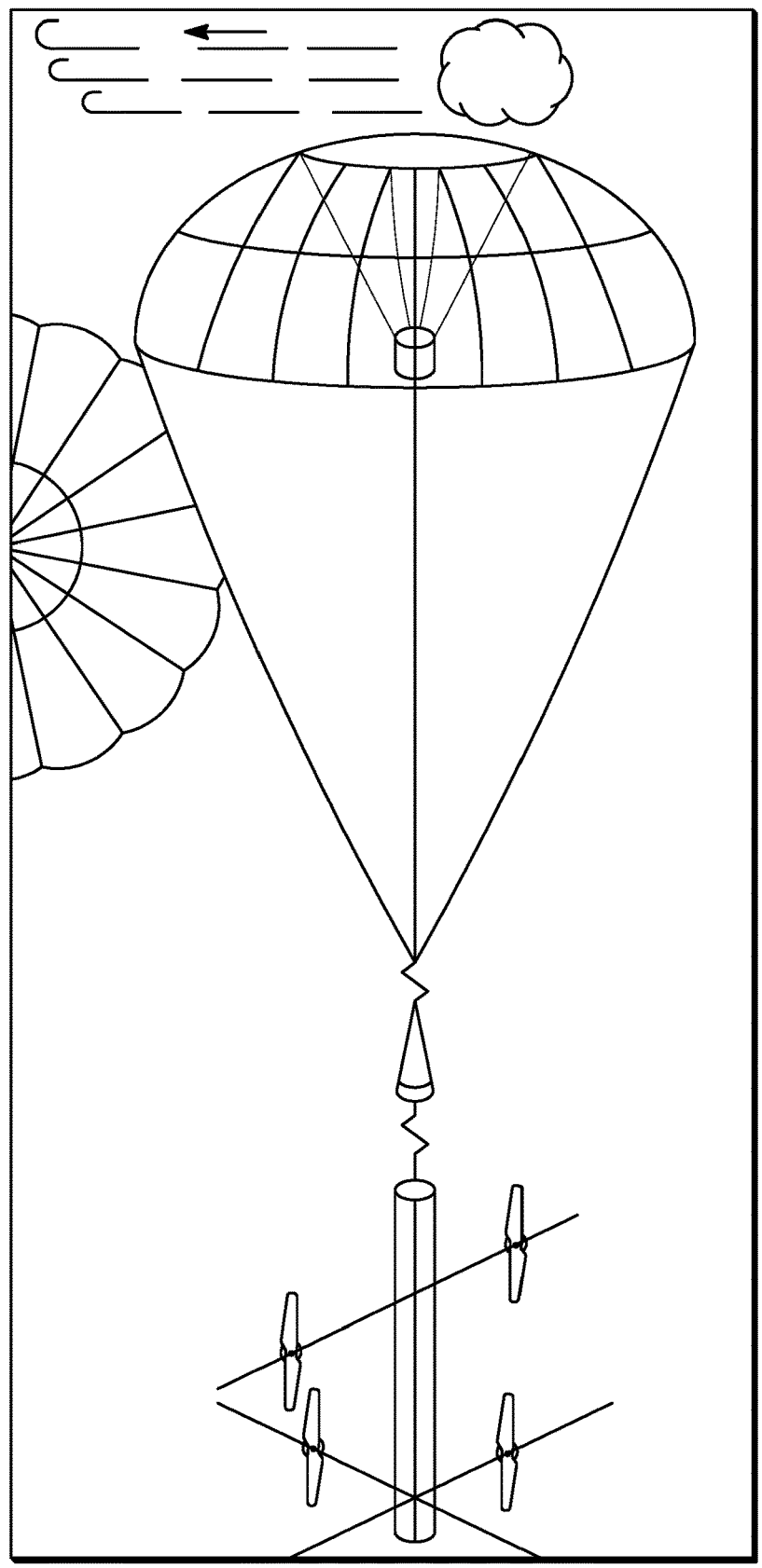
FIGS. 26A to 26D present schematic diagrams of parachute systems in an embodiment of the invention.
Figure 26B:
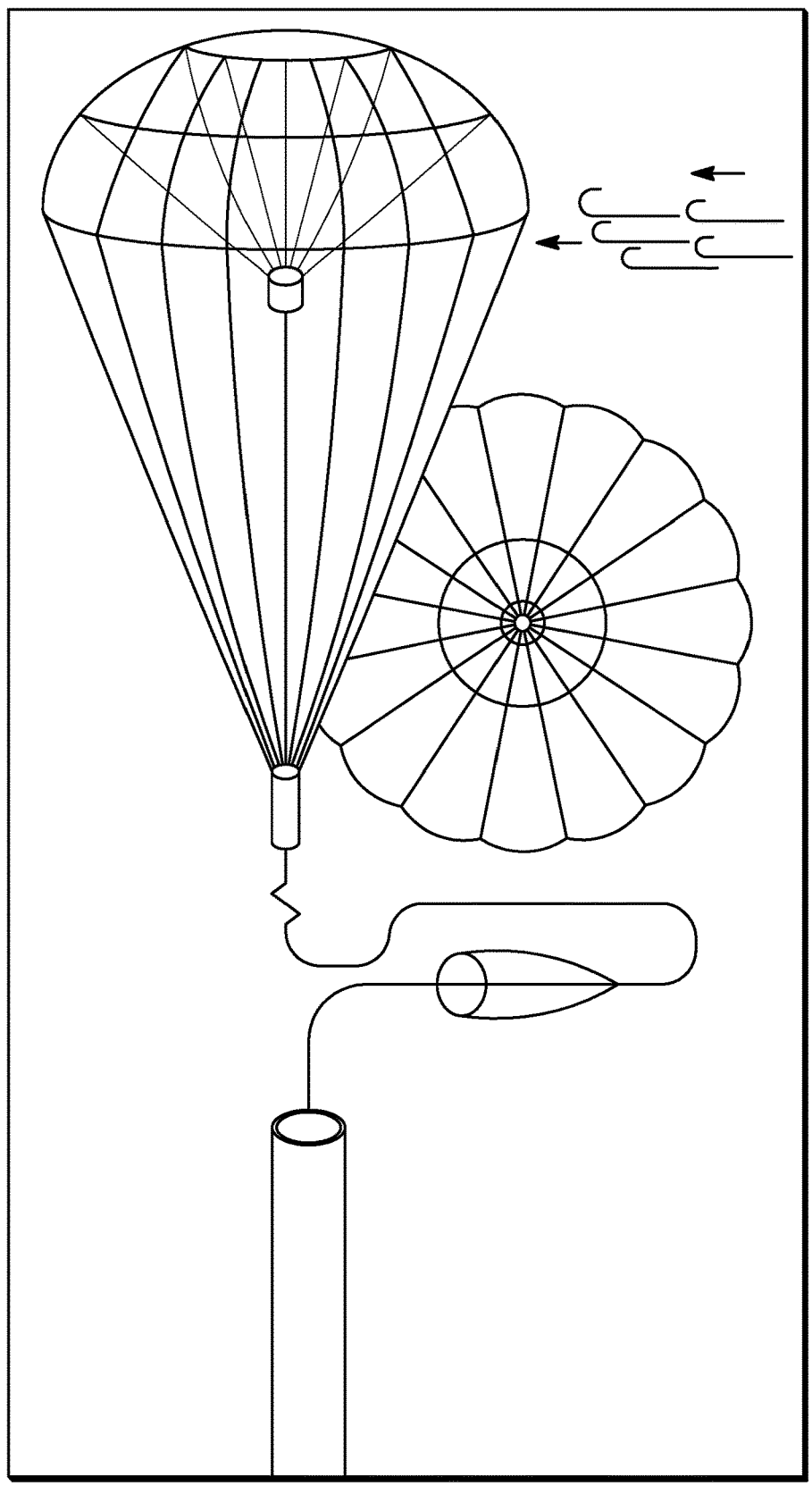
Figure 26C:
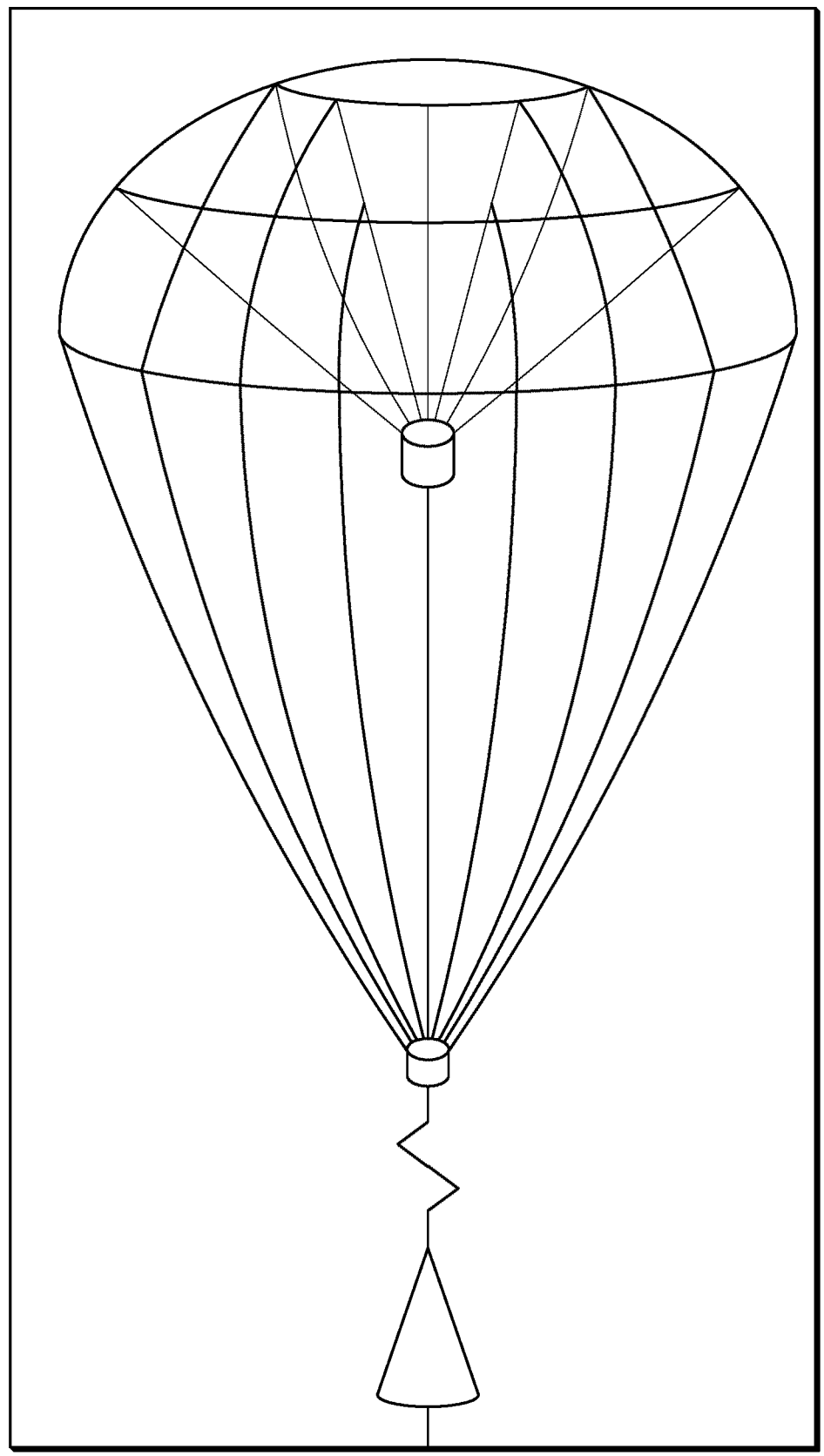
Figure 26D:
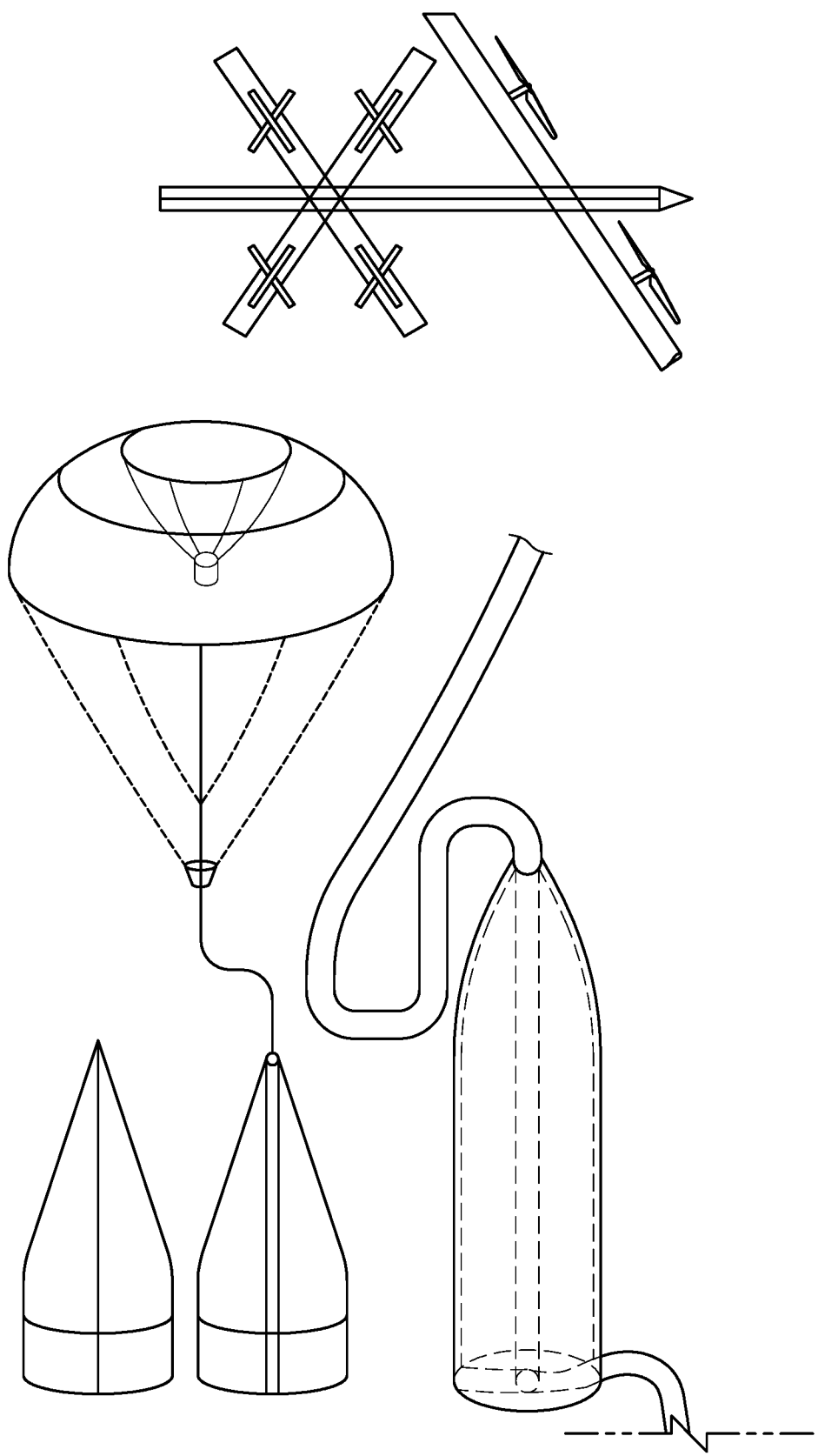
Figure 27A:
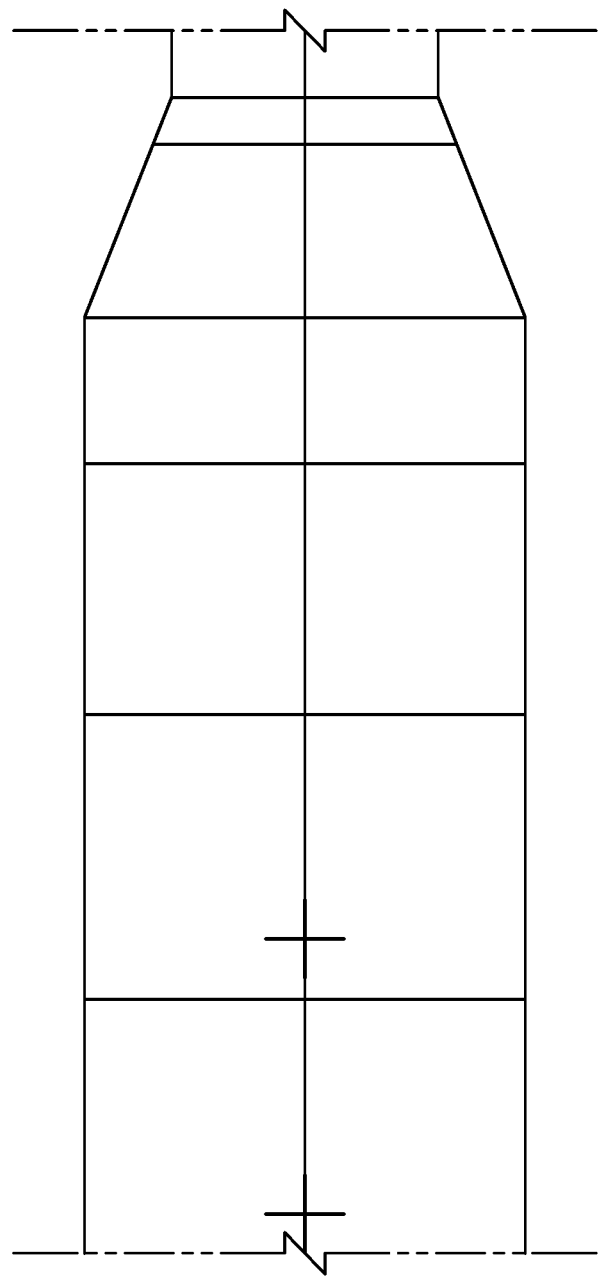
FIGS. 27A to 27D present schematic diagrams of a two-component embodiment of the invention.
Figure 27B:
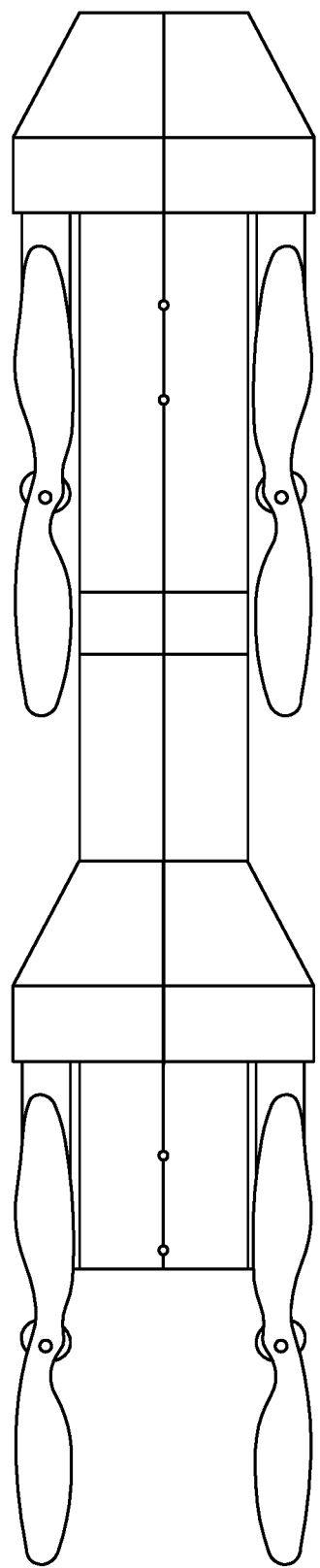
Figure 27C:
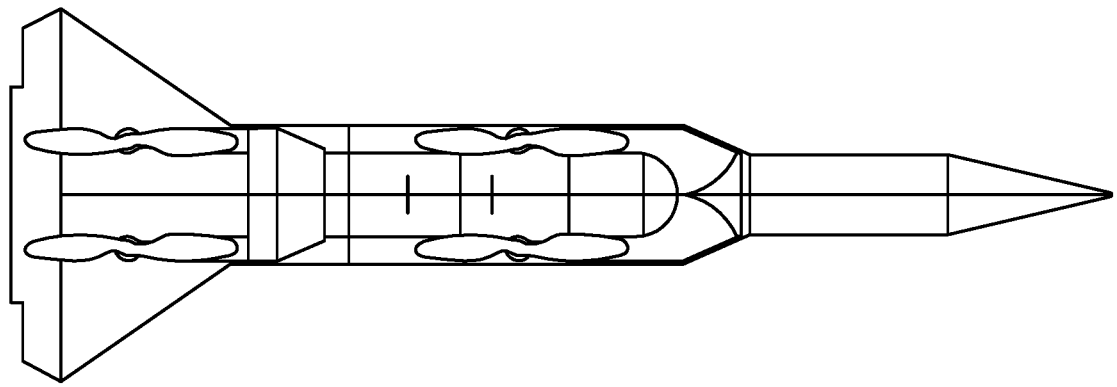
Figure 27D:
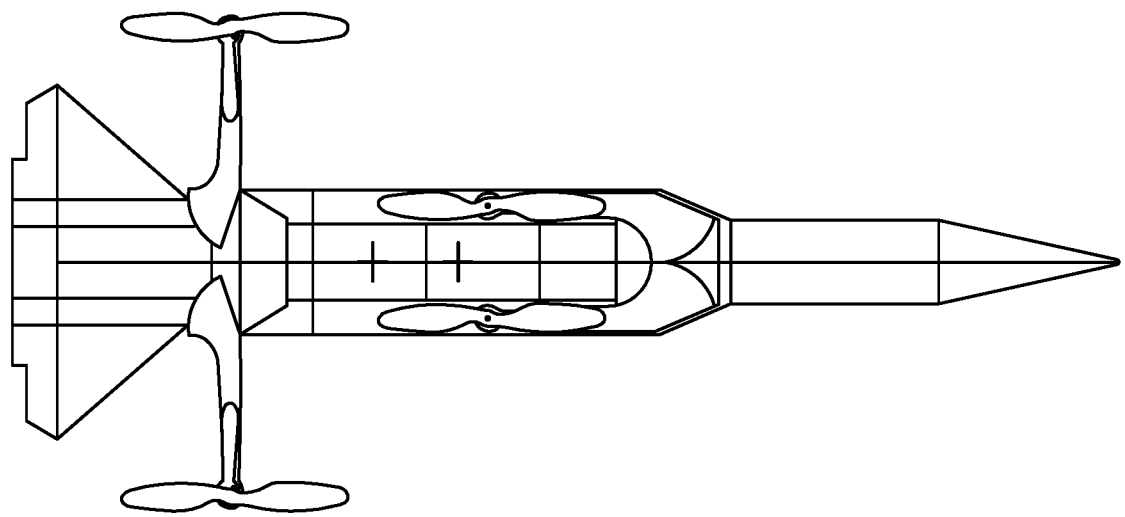
Figure 28:
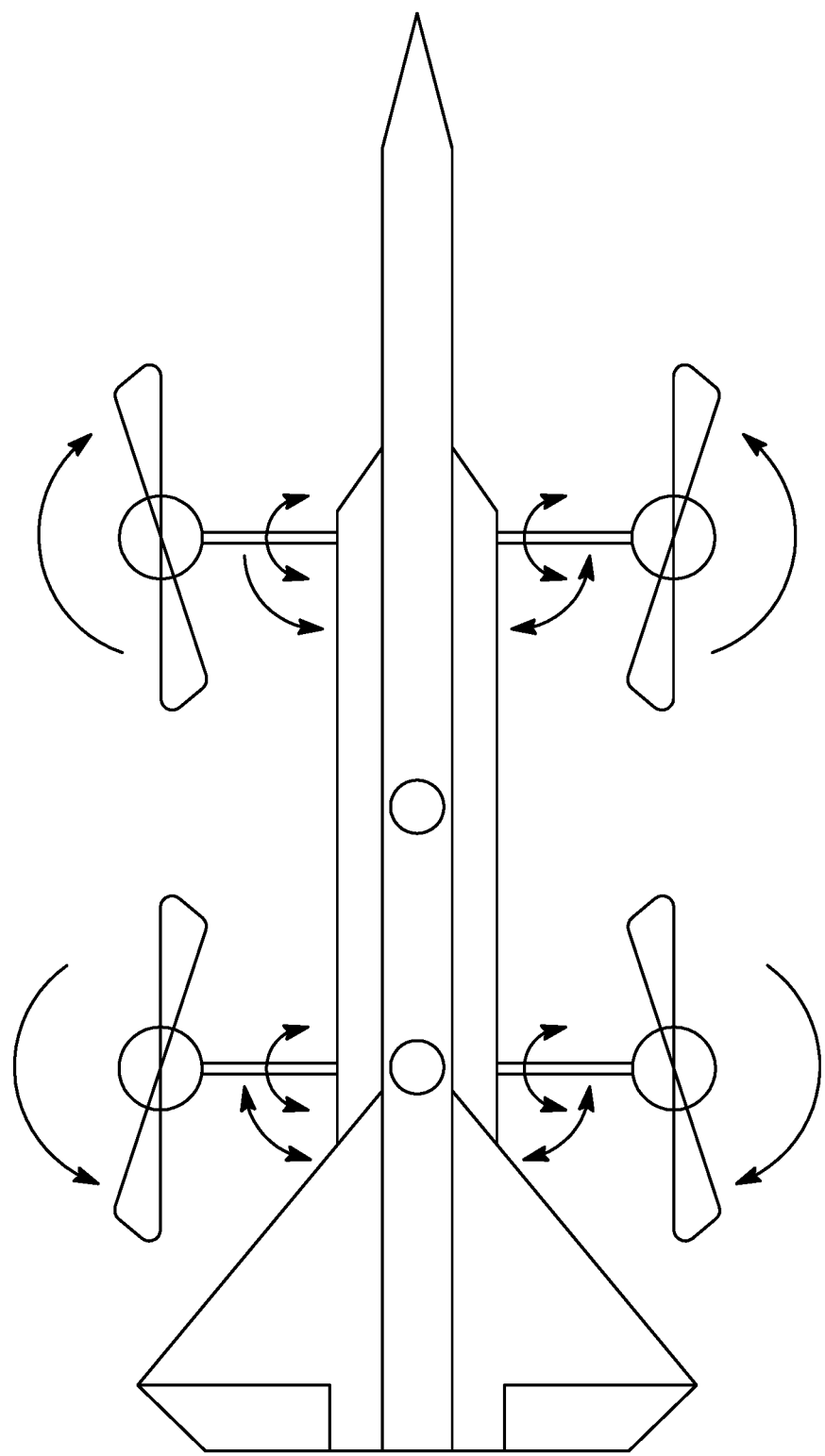
FIG. 28 presents a schematic diagram of an embodiment of the invention, with the center of gravity and center of pressure identified.

Parachute/Satellite Embodiment:

An additional feature/functionality for the Rocket Drones described above could comprise the components of a satellite incorporated into a retractable parachute configuration. Exemplary schematic diagrams are shown in FIGS. 26A to 26C.

By using the Rocket Drone, the decent rate can be slowed to allow a longer duration flight. The Rocket Drone also provides improved directional control to overcome drifting issues, maintain continuity and improve stability.

For example, the basic Rocket Drone (MC1) design could be configured with the Retractable, Satellite/Parachute (RSP), launched to a high altitude, deploy the drone rotors and RSP. It can then establish a video/data/communication link, maneuver, track or maintain position, and then retract the RSP to resume flight mode.

Within the RSP configuration is an additional tension control system attached to the satellite portion within the parachute to point or pivot the satellite from inside center and within the parachutes outermost leads. Leads are attached to the outermost edges of the parachute and the satellite configuration in the center, connecting to a tension sensor and control system.

Two-Component Design:

A further variation of the Rocket Drone employs two components that can operate as a single device or separated, as shown in FIGS. 27A-27D. This configuration allows the device to become a quadcopter and rocket that is capable of operating as two components, independent of each other.

One possible scenario/use of the two component Rocket Drone, MC-4, is as follows: The MC-4 launches as a single device, achieves first stage, releases the Quadcopter Drone from the fuselage, and then activates the quadcopter function in the Rocket Drone fins and parachute. The Quadcopter Drone now can operate at a high altitude or extended distance independently of the Rocket Drone. The Rocket Drone is now free to return under control. This same configuration could also use the Quadcopter Drone within the Rocket Drone fuselage to deliver the Rocket Drone to a new position.

CONCLUSIONS

One or more currently preferred embodiments have been described by way of example. It will be apparent to persons skilled in the art that a number of variations and modifications can be made without departing from the scope of the invention as defined in the claims.

All citations are hereby incorporated by reference.

What is claimed is:

1. An unmanned vehicle comprising:
    a fuselage;
    a propulsion unit engaged with said fuselage, and operable to propel said unmanned vehicle to a desired altitude or location during a launch stage;
    multiple rotors pivotally engaged with said fuselage;
    a rotor positioning system operable to pivot said multiple rotors between a stowed position and a deployed position, the stowed position minimizing drag and instability during the launch stage, and the deployed position allowing the multiple rotors to control the position and altitude of the unmanned vehicle;
    a wireless receiver to receive commands to control said multiple rotors and hence the position of the unmanned vehicle; and
    actuatable pins for holding the multiple rotors in the stowed position until released, by a parachute charge of the propulsion unit being detonated, allowing the multiple rotors to be transitioned to the deployed position.

2. The unmanned vehicle of claim 1, wherein said multiple rotors are driven by electricity, and said unmanned vehicle further comprises batteries to drive said multiple rotors.

3. The unmanned vehicle of claim 1, wherein the rotor positioning system comprises:
    a spring configured to urge the multiple rotors to the deployed position.

4. The unmanned vehicle of claim 1, the actuatable pins being
    configured to hold said multiple rotors in line with the main axis of the fuselage while in the stowed position.

5. The unmanned vehicle of claim 1, wherein the rotor positioning system comprises:
    a plurality of strings, a first string end being fixed to an end of the multiple rotors distal to the pivot point, and a second string end being engaged with a parachute cone;
    whereby when the parachute cone is discharged, the strings actuate the multiple rotors to the deployed position.

6. The unmanned vehicle of claim 1, wherein the rotor positioning system comprises a servo electric device.

7. The unmanned vehicle of claim 1, wherein the rotor positioning system comprises a solenoid.

8. The unmanned vehicle of claim 1, wherein the propulsion unit comprises a solid fuel rocket engine.

9. The unmanned vehicle of claim 1, wherein each of the multiple rotors comprises multiple elongated blades, fixed to a rotating shaft, the multiple elongated blades lying substantially in the same plane wherein the multiple rotors are in the deployed position.

10. The unmanned vehicle of claim 9, wherein said same plane is substantially perpendicular to the main axis of the fuselage.

11. The unmanned vehicle of claim 9, wherein the unmanned vehicle comprises autonomous control.

12. The unmanned vehicle of claim 1, wherein the multiple rotors and fuselage are arranged in a vertical takeoff and landing arrangement.

13. The unmanned vehicle of claim 1, wherein the propulsion unit comprises a rocket engine operable to provide rocket operation, and said unmanned vehicle is configured to transform between any pairing of submersible, copter, aircraft and/or rocket operation.

14. The unmanned vehicle of claim 1, wherein the unmanned vehicle comprises autonomous control.

15. The unmanned vehicle of claim 1, wherein the unmanned vehicle comprises wireless control.

16. The unmanned vehicle of claim 1, wherein the unmanned vehicle comprises a control system configured to orient the fuselage along any axis while holding relative position in the air or underwater.

17. The unmanned vehicle of claim 1, wherein the unmanned vehicle is configured to transition from water operation into atmospheric operation.

18. The unmanned vehicle of claim 1, wherein the unmanned vehicle comprises a modular construction.

19. The unmanned vehicle of claim 18, wherein the modular construction comprises separate drone and rocket modules, the drone module supporting said multiple rotors and the rocket module supporting said propulsion unit;
    the drone module and the rocket modules both comprising control systems so they are capable of control and operation independent of the other.

20. The unmanned vehicle of claim 18, wherein modules of the modular construction comprise a connector configured so they are selectively removable from one another.

21. A method of operation for an unmanned vehicle, comprising the steps of:
    positioning multiple rotors, pivotally engaged with a fuselage, in a stowed position using releasing actuatable pins, minimizing drag and instability during a launch stage;
    igniting a propulsion rocket engaged with said fuselage, to bring said unmanned vehicle to a desired altitude and/or location during the launch stage;
    releasing said actuatable pins by detonating a parachute charge of the propulsion rocket, and pivoting said multiple rotors to a deployed position; and
    energizing the multiple rotors and receiving commands via a wireless receiver to control said multiple rotors and hence to control the position and altitude of the unmanned vehicle.

22. The method of claim 21,
    wherein said pivoting said multiple rotors to a deployed position comprises:
    allowing a spring to urge the multiple rotors to the deployed position.

23. The method of claim 21, wherein the unmanned vehicle is configured to transform between any pairing of submersible, copter, aircraft and/or rocket operation.

24. The method of claim 21, wherein the unmanned vehicle comprises wireless control.

25. The method of claim 21, wherein the unmanned vehicle comprises a control system configured to orient the fuselage along any axis while holding relative position in the air or underwater.

26. The method of claim 21, wherein the unmanned vehicle is configured to transition from water operation into atmospheric operation.

27. The method of claim 21, wherein the unmanned vehicle comprises a modular construction.

28. The method of claim 27, wherein the modular construction comprises separate drone and rocket modules, both comprising control systems so they are capable of control and operation independent of the other.

29. The method of claim 27, wherein modules of the modular construction comprise a connector configured so they are selectively removable from one another.

\* \* \* \* \*